United States Patent [19]

Trigg et al.

[11] Patent Number: 5,236,875
[45] Date of Patent: Aug. 17, 1993

[54] DENSE SIC CERAMIC PRODUCTS

[75] Inventors: Mark B. Trigg, Mulgrave; John Drennan, Wheelers Hill; David G. Hay, Greensborough; Chull H. Oh, Knoxfield; Rainer Dietrich, Beaumaris, all of Australia

[73] Assignees: Western Mining Corporation Ltd., Melbourne; Foseco Pty. Ltd., Padstow, both of Australia

[21] Appl. No.: 720,461
[22] PCT Filed: Oct. 26, 1990
[86] PCT No.: PCT/AU90/00518
§ 371 Date: Jun. 20, 1991
§ 102(e) Date: Jun. 20, 1991
[87] PCT Pub. No.: WO91/06515
PCT Pub. Date: May 16, 1991

[30] Foreign Application Priority Data

Oct. 26, 1989 [AU] Australia ............... PJ7094

[51] Int. Cl.$^5$ ............................. C04B 35/56
[52] U.S. Cl. .................... 501/89; 501/88; 264/65
[58] Field of Search ........... 501/88, 89; 264/65

[56] References Cited

U.S. PATENT DOCUMENTS

| | | |
|---|---|---|
| 1,818,904 | 8/1931 | Martin et al. |
| 2,040,236 | 5/1936 | Benner et al. ............ 106/9 |
| 2,806,005 | 9/1957 | White ..................... 252/516 |
| 3,759,725 | 9/1973 | Steen ..................... 106/44 |
| 4,004,934 | 1/1977 | Prochazka ............... 106/44 |
| 4,041,117 | 8/1977 | Prochazka ............... 264/63 |
| 4,108,929 | 8/1978 | Prochazka et al. ...... 264/29.1 |
| 4,124,667 | 11/1978 | Coppola et al. ......... 264/29.5 |
| 4,230,497 | 10/1980 | Schwetz et al. ......... 106/44 |
| 4,238,434 | 12/1980 | Enomoto et al. ........ 264/66 |
| 4,354,991 | 10/1982 | Suzuki et al. ........... 501/89 |
| 4,537,735 | 8/1985 | Enomoto et al. ........ 264/65 |
| 4,564,490 | 1/1986 | Omori et al. ............ 264/65 |
| 4,569,922 | 2/1986 | Suzuki et al. ........... 264/65 |
| 4,710,435 | 12/1987 | Nakano et al. ......... 428/698 |
| 4,829,027 | 5/1989 | Cutler et al. ............ 264/65 |
| 4,855,263 | 8/1989 | Kawasaki et al. ....... 501/88 |
| 4,876,226 | 10/1989 | Fuentes ................... 501/89 |

OTHER PUBLICATIONS

Lange, F. F. "Hot-pressing behaviour of silicon carbide powders with additions of aluminium oxide", *Journal of Materials Science 10* (1975) pp. 314-320.

Omori, Mamoru and Humihiko Takei "Pressureless Sintering of SiC"; *Communications of the American Ceramic Society;* Jun. 1982; p. C-92.

Negita, Keishi "Effective Sintering Aids for Silicon Carbide Ceramics: Reactivities of Silicon Carbide with Various Additives"; *Communications of the American Ceramic Society 6,* Dec. 1986, pp. C-308-309.

Nakayoshi, Y. Specification Kawasaki Refractories, JP 01230472 * English Translation Submitted Jul. 1989.

Alliegro, R. A. College of Ceramics, State University of New York of Alfred University, Alfred, N.Y. "Pressure-Sintered Silicon Carbide", p. 386, *Journal of The American Ceramic Society.* Nov. 1956.

Artemova, A. A. et al. *Inorg. Mater. (USA),* vol. 10, No. 12 (Dec. 1974) (Publ. May 1975), "Shock Synthesis of The Ceramics $Al_2O_3$—Mo and $Al_2O_3$—SiC"; pp. 1909-1910.

*Primary Examiner*—Mark L. Bell
*Assistant Examiner*—Chris Gallo
*Attorney, Agent, or Firm*—Larson and Taylor

[57] ABSTRACT

A process for the liquid phase sintering of silicon carbide, comprising forming a shaped, consolidated powder body which, not allowing for binder, comprises a powder mixture containing at least 75 wt % silicon carbide and from 1 to 25 wt % (calculated as $Al_2O_3$) of a powder comprising a source of aluminum selected from alumina, precursors for alumina and mixtures thereof. The body is heated in a non-oxidising atmosphere to a sintering temperature of from 1500° C. to 2300° C. to form a liquid phase and a resultant liquid phase sintered body. In said heating step, the body is heated in the presence of a source of magnesium which is distinct from the source of aluminum and comprises at least one of magnesia, precursors for magnesia, magnesium vapour and combinations thereof, whereby said liquid phase produces secondary oxide constituent.

59 Claims, 1 Drawing Sheet

DENSE SIC CERAMIC PRODUCTS

TECHNICAL FIELD

The invention relates to the production of dense articles of SiC.

BACKGROUND OF THE INVENTION

Shaped articles comprising polycrystalline SiC are known. They are characterized by excellent physical properties, such as high resistance to thermal shock, abrasion and oxidation, together with high levels of strength and thermal conductivity. It is this combination of properties which makes SiC materials leading candidates for engineering applications. However, this combination of properties only concurs in high density materials.

During high temperature heat treatments of prerequisite powder compacts, a reduction in the surface energy of the system can occur. The reduction in surface energy is through the diffusion of atoms by either grain boundary diffusion and subsequent densification, or by grain growth through surface diffusion mechanisms with virtually no macroscopic densification. At the high temperatures required for the sintering of SiC powder compacts, surface diffusion typically prevails over grain boundary diffusion. This results in coarsening of the SiC grains in a powder compact with little macroscopic densification taking place.

The oldest process for production of dense articles of SiC is that of reaction sintering, in which silicon liquid or vapour is infiltrated into a compacted body of SiC powder and C. The Si reacts with the C to form SiC in situ which bonds the powder particles. However, this process typically leaves from 8 to 12 volume percent of free Si, which sets a maximum operating temperature of about 1300° to 1400° C. for the resultant densified article.

In more recent times, attention has been directed to the use of certain additives which promote grain boundary diffusion over surface diffusion for pressureless sintering of SiC. However, apart from B or certain compounds thereof, found to be effective in increasing grain boundary diffusion, there does not appear to have been any successful proposal, at least in terms of commercial utility. Moreover, even with use of B or a B compound, problems still exist.

In use of B or a B compound, C usually is added as disclosed in U.S. Pat. Nos. 4,004,934, 4,041,117 and 4,108,929 all to Prochazka and U.S. Pat. No. 4,124,667 to Coppola et al. It is indicated that the B reduces the surface $SiO_2$ layer on the SiC powder to SiC and CO. In U.S. Pat. No. 4,041,117, Prochazka suggests that the $SiO_2$ can halt densification of SiC compacts so that little or no shrinkage can occur. Prochazka also suggests that the addition of C can limit exaggerated grain growth during densification. However, he further indicates that grain growth can only be inhibited by strict control of temperature and pressure within narrow limits. Also, the final product usually contains C particles in the microstructure which can lead to degradation of mechanical properties of the product.

The literature on effective sintering aids for SiC powder, other than B or B compounds, is credited as having commenced with Alliegro et al, J. Amer. Ceram. Soc. 39 [11] 386–89 (1056). This reference discloses that 1% Al addition to α- or β-SiC powder enables densification by hot-pressing to about 98% of the theoretical density. The β-SiC powder was synthesised from a Si/C mixture, in which case, the Al usually was added to that mixture as oxide that was reduced during the synthesis. With use of α-SiC powder, the Al evidently was added as the metal powder. Alliegro et al report that Fe, Li, Ca and Cr also aided densification, but that Mg, Ta, Co, Ba, Mo, W, Sr and Cu were not beneficial whether used alone or with Al.

Artemova et al, in Neoroanicheskie Materialy, Vol. 10, No. 12, pp 2228–9, Dec. 1974, report on the preparation of a densified product by shock compression employing an explosive charge. Powdered $SiC/Al_2O_3$ mixtures ranging from 10/90 to 90/10 mole percent, in 10 mole percent increments, were used and attained in excess of 98% of the theoretical density for the mixtures. This mode of densification, having some similarity to hot-pressing, suggests the suitability of $Al_2O_3$ as an additive in SiC densification by more conventional procedures. However, Artemova et al report that it has not yet proved possible to densify mixtures of $SiC/Al_2O_3$ at all by the usual methods.

Lange, J. Mater. Sci. 10 [1975] 314–320, reports on the hot pressing of both α- and β-SiC powder with use of $Al_2O_3$ as a densification aid. While only quite small additions of $Al_2O_3$ were used, ranging from 0.01 to 0.15 volume fractions, densities up to and greater than 99% of the theoretical density were achieved. Densification was attributed to a liquid phase which formed at high temperatures. However, the use of $Al_2O_3$, even at such low levels, was reported to result in large second phase streaks of $Al_2O_3$ of up to several millimeters long and usually 10 to 15 μm wide. For brittle materials such as ceramics, the presence of a flaw, such as a crack, pore or inclusion can result in stress concentration leading to failure. Streaks as reported by Lange would inevitably be detrimental to the physical properties of the densified SiC, as they greatly increase the defect size in the material.

It was speculated by Lange that the streaks of $Al_2O_3$ were the result of laminar void spaces present in the cold pressed specimens. Possible solutions to eliminate or reduce the occurrence of the streaks was to employ a "sandwich" approach using layers of thinner bodies which, when compacted, formed thicker bodies. This technique would be limited to procedures such as hot pressing. Another technique proposed was grain growth of the SiC grains. Under industrial conditions, the presence of such voids is always possible with the probability of their occurrence increasing with increasing thickness of the component. Grain growth of SiC to aid the removal of such streaks may prove difficult to control in practice. Excessive grain growth is a problem associated with some of the techniques employed for pressureless sintering of SiC. This is considered to be a disadvantage in the use of $Al_2O_3$ as a densification aid. No indication was given by Lange as to whether $Al_2O_3$ would be an effective aid for the pressureless sintering of SiC.

Omori et al, J. Am. Ceram. Soc. 65 [1982] C-92, disclose the use of oxide additives, viz. $Al_2O_3$ and $Y_2O_3$, in the Pressureless sintering of β-SiC powder. The oxides were used separately at 10 wt %, and in combination to a total of 10 wt % at ratios of 4:1, 3:2, 1:1, 2:3 and 1:4. Densification was achieved with 10% $Al_2O_3$, but only with 4% shrinkage and a relative apparent density of about 75%. With decreasing $Al_2O_3$ content, densification was enhanced to about 97% of the theoretical density at an oxide ratio of 1:1, but the level of the fired bulk density thereafter decreased and, with 10 wt % of $Y_2O_3$ alone, no benefit was obtained over β-SiC alone. Omori et al reasonably conclude that $Al_2O_3$ enhances pressureless sintering despite its partial loss attributed to sublimation, but that $Y_2O_3$ does not. However, the results do suggest that, to a degree, $Y_2O_3$ improves the beneficial effect of $Al_2O_3$. Omori et al report the loss of $Al_2O_3$ on sintering, with a residue of this oxide being determined by chemical analysis but not by X-ray diffraction.

A more recent study by Negita, J. Am. Ceram. Soc. 69 [12] C-308-C-310 (1986), reports on the selection of suitable densification aids for the sintering of SiC. Using thermodynamic arguments, Negita reported that metal additives such as B, Al, Fe, Ni and Mg should be effective sintering aids for SiC and that this had been found to be the case experimentally. In relation to B, Al and Fe, this accords with the work of others, as detailed above. On the basis of the same arguments, Negita reports that metal oxides, including $Al_2O_3$, BeO, $Y_2O_3$ HfO and rare earth oxides, should be effective densification aids, and that this was borne out experimentally at least for $Al_2O_3$, BeO, $Y_2O_3$, $La_2O_3$, $Ce_2O_3$ and $ThO_2$.

In contrast to the oxides listed in the previous paragraph, Negita reports that metal oxides including CaO, MgO and $ZrO_2$ are indicated not suitable as they tend to decompose SiC. In addition, Negita suggests that the use of C with metal oxides is indicated as beneficial in the case of $Al_2O_3$, BeO, $Y_2O_3$, CaO, $ZrO_2$, $HfO_2$ and rare earth oxides.

The use of $Al_2O_3$ as a densification aid in the pressureless sintering of SiC powder is disclosed in U.S. Pat. No. 4,354,991 to Suzuki et al. The proposal of this reference is to mould a mixture of an oxygen-containing Al-compound, which can be converted into Al oxide by heating in a non-oxidative atmosphere at a ratio of 0.5 to 35 wt % $Al_2O_3$, with the remaining ceramic material substantially being SiC. Such moulded mixture is subjected to pressureless sintering in a non-oxidative atmosphere at 1900° C. to 2300° C. Despite the requirement that the oxygen-containing compound is one which can be converted into Al oxide, it evidently is envisaged that the compound can be Al oxide. However, a number of disadvantages, of which some are confirmed by our work on the pressureless sintering of mixtures of SiC and $Al_2O_3$, are apparent from U.S. Pat. No. 4,354,991.

The fired bulk densities obtained by the teaching of U.S. Pat. No. 4,354,991 are relatively low, and also subject to substantial variation with firing conditions. Also, the sintering times are relatively long, ranging from a preferred minimum of 2 hours up to 24 hours, with 3 to 5 hours being typical even with relatively small samples. In a continuous process for densification of SiC powder, such reaction times would result in lower production rates. Furthermore, another problem exists in the preferment for control and maintenance of Al species in the firing furnace atmosphere for long periods of time required for sintering.

No mention is made in U.S. Pat. No. 4,354,991 of the formation of streaks of $Al_2O_3$ as reported in the above-mentioned article by Lange, even though such defects are likely to be a characteristic of the use of $Al_2O_3$ alone. As suggested by Lange, long soak times may be required to eliminate such streaks, and this possibly explains the relative long sintering times taught by U.S. Pat. No. 4,354,991. However, as indicated herein, the use of such sintering times is disadvantageous.

We have found that a further apparent characteristic of the use of $Al_2O_3$ alone as a sintering aid for SiC powder is the tendency for zoning, particularly in the production of relatively large articles. That is, we have found that use of $Al_2O_3$ alone has a pronounced tendency to produce a well densified outer layer enclosing an internal core which can exhibit substantially less densification. Where zoning occurs, the article is at least less than optimum. Also, internal stress due to the zoning can result in the article exhibiting cracks or, in extreme cases, the article can fail completely with the outer layer spalling.

The tendency for zoning with the use of $Al_2O_3$ alone as a sintering aid for SiC powder, as taught by U.S. Pat. No. 4,354,911, is believed to be due to the difficulty of producing a sufficient volume percent of liquid phase at an appropriate temperature. This difficulty may also explain the tendency for streak formation as reported by Lange, or streak formation may exacerbate the difficulty in achieving a sufficient volume of liquid phase. As is known, efficient liquid phase sintering requires not only the formation of a liquid phase at a suitable temperature, but also the presence of that phase in a sufficient volume over a suitable temperature range.

In the proposal of U.S. Pat. No. 4,354,911, formation of a suitable liquid phase is not possible simply by melting of $Al_2O_3$, except at extremely high temperatures. The melting point of $Al_2O_3$ is about 2015° C., while decomposition and loss by volatilization of decomposition products thereof commences below that temperature, as recognised by Suzuki et al and also taught by the above-mentioned article by Omori et al. Despite the sole addition of $Al_2O_3$ as a sintering aid, $SiO_2$ also is present as an impurity layer up to about 2 wt % on finely divided SiC powder (unless previously removed), and the $SiO_2$ can facilitate the formation of a liquid phase at a temperature below the melting point of $Al_2O_3$.

Reference to the phase diagram for the $SiO_2$-$Al_2O_3$ binary system shows a eutectic composition at about 93% $SiO_2$—7% $Al_2O_3$ which has a melting point at about 1595° C. Thus, assuming that the rate of heating to the sintering temperature range of 1900° to 2300° C. is not excessive, solid-solid diffusion between the separate $Al_2O_3$ and $SiO_2$ can give rise to an initial small volume of liquid at temperatures above 1595° C. Also, $SiO_2$ melts at about 1730° C. and, assuming that the $SiO_2$ is not previously volatilized or decomposed, as tends to occur, a small volume of $SiO_2$-containing liquid phase can be formed above 1730° C. and this can increase in volume by taking up $Al_2O_3$ by liquid-solid diffusion.

In the method taught by Suzuki et al in U.S. Pat. No. 4,354,911, the lower level of $Al_2O_3$ addition is 0.5 wt %, corresponding to an $SiO_2$ to $Al_2O_3$ ratio on the $Al_2O_3$ rich side of the eutectic of the $SiO_2$-$Al_2O_3$ binary system. That is, when allowance is made for 2.0 wt % $SiO_2$ being high and 0.5 wt % $Al_2O_3$ being a minimum, it is apparent that a best possible ratio is about 80% $SiO_2$: 20% $Al_2O_3$. A lower $SiO_2$ content or a higher $Al_2O_3$ content rapidly advances that ratio away from the eutectic composition to increasily richer $Al_2O_3$ contents. At only 2.0 wt % $Al_2O_3$, the ratio is at least at the mid-point of the $SiO_2$-$Al_2O_3$ phase diagram. At 4.0 wt % $Al_2O_3$, the ratio is such that little, if any, liquid previously formed will remain, with further liquid then not being formed until a temperature of about 1840° C. is achieved. That is, with an $Al_2O_3$ content of at least 4.0 wt % $Al_2O_3$, any liquid initially formed will be substantially lost, due to precipitation of a corundum or mullite solid phase having a melting point of about 1840° C. However, given that an $Al_2O_3$ addition of only 0.5 wt % still is on the $Al_2O_3$-rich side of the eutectic composition, at least a proportion of any initially formed liquid with less than 4.0% $Al_2O_3$ additions will similarly be lost due to precipitation of corundum or mullite. These problems are further exacerbated by the tendency for $SiO_2$ and $Al_2O_3$ to decompose and to be lost by volitization of their decomposition products at temperatures approaching 1840° C., making it very difficult to produce, or produce and retain, a significant volume of a liquid phase. Also, $Al_2O_3$ present at a level significantly in excess of 4.0 wt % will not be able to be taken fully into solution below at least about 1840° C., with the temperature at which this is possible rapidly increasing with the level of $Al_2O_3$ addition to about 2015° C. Moreover, if there is only alumina present, a liquid phase cannot be formed below the melting point of $Al_2O_3$, that is, below about 2015° C., and even then, a liquid will only form if some $Al_2O_3$ is retained until that temperature is attained.

The precipitation of corundum or mullite from initially formed liquid may explain the streaks of $Al_2O_3$ reported in the above-mentioned article by Lange. The streaks are referred to by Lange as suggesting a "frozen liquid". This may well have resulted from corundum or mullite precipitated from an initially formed liquid, and only partially remelted on heating at about 1840° C.

For the temperature range of 1900° C. to 2300° C. taught by Suzuki et al in U.S. Pat. No. 4,354,911, and the addition of $Al_2O_3$ alone at from 0.5 to 35% as a sintering aid for SiC, it therefore is extremely difficult to achieve a liquid phase at all, let alone one in a sufficient volume for efficient liquid phase densification. As the $Al_2O_3$ level increases above 0.5%, the temperature at which fully liquid $SiO_2$ and $Al_2O_3$ is present also increases, and the volume of liquid able to be produced below the 1840° C. solidus decreases. Particularly above about 4% $Al_2O_3$, it can be necessary to use a temperature substantially above 1900° C. in order to achieve any significant volume of liquid at all.

A further disadvantage of the proposal of U.S. Pat. No. 4,354,991 arises from the strong preferment for use of β-SiC powder, rather than, α-SiC powder. β-SiC is not as readily available as α-SiC as produced by the conventional Acheson process for the manufacture of SiC grit. That process accounts for a major portion of world-wide production of SiC and α-SiC is readily available and is a commodity traded on the world market.

In International patent specification PCT/US88/00040 (WO88/05032), Fuentes discloses the pressureless sintering of SiC powder, using as a sintering aid a combination of $Al_2O_3$ and CaO. Fuentes recognises that with use of $Al_2O_3$ alone as a sintering aid for SiC, the liquid phase necessary for sintering is deficient in volume and/or forms too slowly. He therefore teaches use of a sintering aid mixture which produces a liquid phase at from 1815° to 1855° C. and comprises $Al_4O_4C$ and $Al_2OC$. However this liquid phase, which also can be generated by use of $Al_4O_4C$ and $Al_2OC$ ab initio, itself forms at an excessively high temperature for optimum densification. In addition, as reported by Foster et al, *J. Am. Ceram. Soc.* 39 [1956] 1-11, $Al_4O_4C$, $Al_2OC$ and $Al_4C_3$ are very unstable towards both moisture and oxygen. The presence of these species in the product resulting from the process taught by Fuentes is very undesirable, and to be expected to greatly degrade the performance and severely limit the utility of the product. The process and product as disclosed by Fuentes therefore presents significant disadvantages.

In contrast to the prior art discussed above relating to the densification of SiC to produce bodies of high density approaching the theoretical density, the use of oxides for the bonding of SiC grits to form refractory bodies also has been considered. Thus, in U.S. Pat. No. 2,040,236 to Benner et al, the use of a bonding material of $Al_2O_3$ together with either CaO, MgO or a mixture of CaO and MgO was considered for use in bonding SiC grit in producing a refractory body. Benner et al teach the heating in a non-oxidizing atmosphere of a pressed mixture of SiC grit and such bonding material. The heating was to a relatively high temperature, at which the bonding material softened to undergo incipient fusion. However, the rate of heating to temperature was rapid, such as about 35 minutes. Also, it is emphasised that the time at temperature was to be short so that, while sufficient to soften the bonding material, recrystallization of SiC could be avoided. Furthermore, the time at temperature was to be short so that the bonding material did not either decompose or react with the SiC.

The suitable SiC grit proposed by Benner et al ranged from 14 mesh to less than 80 mesh, but with coarse, medium and fine size fractions. Thus 40% was—40 mesh+36 mesh (ranging from less than about 1170 μm to about 410 μm); 10% was—40+70 mesh (ranging from less than about 370 μm to about 190 μm); and 50% was of—80 mesh (ranging down from about 180 μm). While only the small sub-micron portion of the fine size fraction would be appropriate for densification as required by the prior art discussed above, Benner et al report production of a useful refractory compared with use in a similar context of other bonding materials. Their refractory is said to have been very dense and of lower permeability in that context. Microscopic examination (as applicable in 1932) is stated to have shown the product to exhibit pores only partially filled with bond material, while the refractory was permeable to gases. In this regard, the disclosure of Benner et al is devoid of any indication that macroscopic densification of the body occured. Also, the SiC particles of the grit, as confirmed by reference to it as a filler, in essence was bonded in a matrix of the bonding material, with the latter evidently remaining in essentially the proportion of, for example, 5 to 10% in which it was added to the mixture.

The teaching of Benner et al detailed in the preceding two paragraphs is appropriate for the bonding of SiC grit, but does not provide guidance relevant to liquid phase densification SiC powders. That is, they are seeking to produce refractories by bonding SiC grit particles in a matrix. The matrix acts in effect as a cement or glue (in the general sense of these terms) which encapsulates and isolates the SiC grit particles without decomposing or reacting with the SiC of these particles. In contrast, liquid phase sintering necessitates finer SiC powder of a compact being densified being taken into solution and subsequently precipitated, such as onto larger SiC grains, with the end product having clearly defined grain boundaries between SiC grains and any second phase. In effect, Benner et al teach use of a passive bonding material which softens to form a matrix, whereas liquid phase sintering requires the presence of an active liquid phase which is formed by the assistance of sintering aids.

The non-oxidizing atmosphere proposed by Benner et al was required to inert to both the SiC and the bond material. Carbon monoxide is indicated as being satisfactory relative to $Al_2O_3$, MgO and CaO and their mixtures. However, where $SiO_2$ was a principal constituent of the bond material, a more inert atmosphere such as nitrogen or helium was preferred.

Further, in U.S. Pat. No. 4,829,027 Cutler et al disclose liquid phase sintering of SiC with use of a rare earth oxide and $Al_2O_3$; the rare earth oxide principally exemplified being $Y_2O_3$ as in the Omori et al reference considered above. The disclosure of this reference emphasises the importance of attaining a liquid phase at a relatively low temperature, in achieving densification by pressureless liquid phase sintering of SiC, substantiating our findings in relation to a dissimilar system based on use of $Al_2O_3$.

Finally, Japanese patent application 01230472, public disclosure No. 89-230472, by Kurosaki Refractories Co. Ltd., proposes the production of SiC sintered products using alumina/magnesia spinel (i.e. $MgAl_2O_4$) as a sintering aid. Kurosaki teaches that when spinel alone is used as a sintering aid, magnesia will evaporate preferentially from the surface of the spinel powder grains, leaving grain surfaces covered with a layer of $Al_2O_3$. During sintering, a liquid phase is said to form at temperatures of 1900° C. and above; this being seen as beneficial in resulting in little likelihood of deterioration of the excellent high temperature characteristics inherent in SiC. In this regard, the teaching of Kurosaki is to avoid a liquid phase being formed at fairly low temperatures, a matter on which they are at variance with the clear teaching of Fuentes, Cutler et al and our research.

A disadvantage of the teaching of the Kurosaki proposal is the reliance on relatively expensive spinel as the sintering aid, particularly as in excess of 5 wt % spinel is necessary for optimum results. In this matter, the same disadvantage exists with the proposal of Cutler et al in their reliance on expensive rare earth oxides. However, further major disadvantages exist with the proposal of Kurosaki. The first is that arising from the loss of MgO to which they refer since, with increasing level of spinel, the resultant weight loss will be increased; with a possible maximum of about 9.9 wt % due to this factor alone at 35 wt % spinel. However, as made clear by the work of others considered above, and also substantiated by our findings, these weight losses are likely to be exacerbated by additional loss of $SiO_2$. $Al_2O_3$ and SiC. A further important disadvantage is that, due to the spinel grains becoming coated with $Al_2O_3$, any liquid phase initially tending to form will require slow solid-solid diffusion, followed by dissolution of $Al_2O_3$ and spinel, with this occurring to any significant extent in a reasonable time only at temperatures substantially above 1900° C. This will lead to essentially the same problems in achieving a sufficient volume of liquid phase necessary for efficient liquid phase densification, as discussed above in relation to the teaching of Suzuki et al.

SUMMARY OF THE INVENTION

The present invention seeks to provide an improved form of dense articles produced from SiC powder, and to an improved method of producing such articles. In particular, the present invention is directed to providing such articles utilising $Al_2O_3$. However, in the present invention, the use of $Al_2O_3$ is under conditions which overcome problems, exemplified by the prior art and confirmed by our findings, encountered with the use of $Al_2O_3$ alone.

As detailed above, use of $Al_2O_3$ alone as an additive in densification of SiC powder necessitates use of relatively high sintering temperatures and relatively long sintering times. However, even with recourse to such conditions, we have found that it can be difficult to achieve a satisfactory product. Indeed, unless other conditions are satisfied such as use of a powder bed or coating as taught by Suzuki et al in U.S. Pat. No. 4,354,911, the resultant product can exhibit minimal, if any, densification and low strength, such that the product can readily crumble. Also, even where a useful level of densification is achieved, this can be limited to an external surface layer, with the interior of the product being less satisfactorily densified and the sectioned product exhibiting a macroscopically visible cored structure. The interior of a product exhibiting such structure can have a relatively high degree of densification, even comparable to that of the surface layer. However, we have found that densification and compositional differences, or both, between the surface layer and core can result in the product exhibiting cracks which reduce the mechanical properties of the product. These differences can be such that the product as formed has failed, for example by propagation of cracks or spalling of the surface layer from the core, due to stress generated in the product on cooling from the densification temperature. Moreover, streaks of $Al_2O_3$, such as reported in the above mentioned article by Lange, can be present in the microstructure of the product, and it is believed that such streaks can facilitate crack formation or propagation. The disadvantages due to the use of $Al_2O_3$ alone as an additive for densification of SiC powder can be ameliorated, at least to a degree, by use of a relatively high sintering temperature and, more importantly, use of a relatively long time at the sintering temperature of at least about 2 hours, but typically at least 3 hours. However, such expedients substantially decrease production rates, thereby increasing the cost of production. They also result in an increased loss of $Al_2O_3$ by decomposition, and substantially increase the requirements for control and maintenance of species, in the atmosphere in which sintering is conducted, intended to prevent or offset such loss.

We have found that the above problems encountered with use of $Al_2O_3$ alone as an additive for densification of SiC powder can be overcome by use of at least one of $Al_2O_3$ and a precursor for $Al_2O_3$ (herein collectively referred to as the Al source) in combination with at least one of MgO and a precursor for MgO (herein collectively referred to as the Mg source). However, at the outset, it is to be understood that the present invention is concerned with a Mg source which is distinct from the Al source, rather than one which, as in the teaching of Kurosaki, is able to be recognised as an intimate constituent of a material such as spinel.

It also is to be understood that there are important variants of the invention. In a first variant, a combination of the Al and Mg sources is provided as an additive in a powder mixture with SiC powder as prepared to form a powder compact for sintering. In a second variant, only part of the Al source requirement is provided in the powder mixture to form the compact, with the balance of the required Al source being formed in the compact during heating to the sintering temperature from Al-species provided in the atmosphere in which the heating is conducted. In a third variant, not more than part of the Mg source requirement is provided in the powder mixture for the compact, with the balance or all of the required Mg source being similarly formed in the compact during heating from the Mg-species provided in that atmosphere. The second and third variants can be used in combination, with part of the Al source requirement and part or all of the Mg source requirement being formed in the compact from Al-species and Mg-species provided in the atmosphere. Also, provision of Al-species and/or Mg-species in the atmosphere can be of benefit during the first variant, as the species act to offset loss of Al and/or Mg source from the compact, at least at higher temperatures.

The Al-species and Mg-species, able to be provided in the atmosphere in which the compact is heated, comprise species able to be present in the atmosphere in a gaseous condition. However, the species also need to be such that they will permeate the compact and react with a constituent of the compact to form $Al_2O_3$ and MgO. In general, the species comprise elemental AL, $Al_2O$ and elemental Mg. The species may be generated in the furnace in which the compact is heated, as hereinafter detailed, or they can be charged to the furnace in gaseous form from a suitable source, or respective source, external to the furnace.

The beneficial effects of use of an Al source in combination with an Mg source, as set out in more detail in the following, is surprising in view of the prior art considered above. Thus, while the above-mentioned article by Negita reports on the utility of $Al_2O_3$ as a suitable additive for densification of SiC powder, MgO is reported as not being a suitable additive. Moreover, Negita reports in the above-identified paper that CaO which, as will be appreciated, is chemically equivalent to MgO in most contexts, also is not suitable. Fuentes, in the above-mentioned International patent specification PCT/US88/00040 (W088/05032) reports that use of $Al_2O_3$ and CaO can be used in combination as an additive in the pressureless sintering of SiC, but that this combination results in an undesirable secondary phase of $Al_4O_4C$ and $Al_2OC$. We have found that use of $Al_2O_3$ and MgO in combination as an additive in pressureless sintering of SiC does not give rise to such oxy-carbide secondary phase while it also gives rise to important differences of practical benefit not available with the process of Kurosaki.

Moreover, while Benner et al in U.S. Pat. No. 2,040,236 teach that a combination of $Al_2O_3$ and MgO has utility in bonding SiC grit, their teaching indicates strongly that such combination would be unsuitable for densification of SiC powder by pressureless sintering. Thus, while it would be expected that the temperatures taught by Benner et al for bonding SiC grit are at a level appropriate for such sintering of SiC powder, the rapid rate of heating to, and short time at, such temperatures are not suitable for sintering of SiC powder. Their teachings on the avoidance of conditions which result in substantial recrystallization of SiC, in reaction of the $Al_2O_3$, MgO or both with SiC and in substantial decomposition of the $Al_2O_3$ and/or MgO are indicative of conditions which are suitable merely for cementing SiC grit particles in a matrix of bonding material and which are inconsistent with requirements for sintering SiC powder. The teaching of Benner et al is in relation to SiC grit, and problems of recrystallization of SiC and its reaction with such mixture would be expected to be substantially more severe with sintering of SiC powder, given that SiC powder will be very much finer and of substantially greater surface area. In stark contrast, the clear indications are that in the present invention densification, which is substantial, is facilitated by the mechanism of liquid phase sintering. In this mechanism, an important feature is the dissolution and re-precipitation (recrystallization) of finer SiC particles, which is directly opposed to the teaching of Benner et al. The SiC powder required for sintering typically is of a particle size less than 10 $\mu$m, such as of sub-micron size on average. That is, the very much finer particle size and, hence, very much larger surface area, of SiC powder for sintering, compared with the grit of Benner et al, would be expected to result in excessive recrystallization of SiC and loss of SiC by reaction, leading to degradation of physical properties even if macroscopic densification was found to result. Also, under conditions for pressureless sintering of SiC powder with use of $Al_2O_3$ and MgO in combination as an additive, the teaching of Benner et al is that the additive would be lost by decomposition.

DETAILED DESCRIPTION OF THE INVENTION

The present invention provides a process for the production of a dense SiC product, comprising forming a consolidated powder compact by pressing a powder mixture containing at least 65 wt % SiC powder and at least 1 wt % of a powder comprising an Al source, and heating the compact in a non-oxidising atmosphere to a sintering temperature of from 1500° to 2300° C., said compact being heated in the presence of at least one of an Mg source and Mg-species, with the time at said sintering temperature being sufficient to achieve a required level of densification by liquid phase sintering.

Thus, according to the invention, there is provided a process for the liquid phase sintering of silicon carbide, comprising the steps of:

forming a shaped, consolidated powder body which, not allowing for binder, comprises a powder mixture containing at least 70 wt % silicon carbide and from 1 to 25 wt % (calculated as $Al_2O_3$) of a powder comprising a source of aluminium selected from alumina, precursors for alumina and mixtures thereof; and heating the body in a non-oxidising atmosphere to a sintering temperature of from 1500° C. to 2300° C. to form a liquid phase and a resultant liquid phase sintered body;

the body, in said heating step, being heated in the presence of a source of magnesium which is distinct from the source of aluminium and comprises at least one of magnesia, precursors for magnesia, magnesium vapour and combinations thereof, whereby said liquid phase produces secondary oxide constituent.

The process of the invention enables production of a sintered body having a good degree of uniformity of physical properties. Also, the body typically exhibits a microstructure in which SiC grains are substantially equi-axed and of greater grain size uniformity than the SiC powder used. The microstructure shows a reduction in the proportion of fine SiC grains relative to the powder, consistent with the fines of the powder and sharp edges of larger particles having been dissolved. Grains of SiC in the microstructure, in addition to being equi-axed, show a degree of rounding consistent with precipitation of dissolved SiC on and between larger grains, and formation of neck regions at SiC grain boundaries. In these regards, the aspect of the SiC grains is understood to be quite distinct from the fine structure of interlaced tabular, or crossed plate, crystals obtained by the teaching of Kurosaki.

Depending on the level of secondary oxide constituent in the sintered body, the microstructure of the invention can be of duplex form. That is, the secondary oxide can be present as an inter-connected network throughout sintered grains of SiC, with a substantial proportion of adjacent SiC grains exhibiting well defined SiC to SiC grain boundaries. The secondary oxide is rich in Al, and can substantially comprise $Al_2O_3$. The secondary oxide can, and typically does contain Mg. However, while the ratio of Mg to Al in the compact as formed can be as high as 1:2, the secondary oxide typically has a lower ratio (i.e. richer in Al) such as at least 1:3. Also, even though the Mg to Al ratio in the compact can be lower than 1:2 (richer in Al) and typically is, the Mg to Al ratio in the resultant product usually is lower still.

Our research has found that the secondary Al rich oxide constituent produced by in situ reaction of stoichiometric additions of Al source and Mg source does not necessarily result in useful bodies especially for articles with thicker cross sections. Indeed, it has been shown that useful bodies are produced by obtaining a desired Mg to Al ratio in the fired body which is less than 1:3 at low Al source contents and 1:6 at the upper levels of Al source addition. The present process has substantial flexibility in the allowable ratios of Al source and Mg source in the compact as formed. There is no requirement for the loss of Mg at elevated temperatures to allow the formation of a liquid phase by the reaction of the $Al_2O_3$ formed as a decomposition of spinel, as in Kurosaki, with spinel then to initiate the densification of SiC. It has also been found that the use of powder beds can result in an increase in the amount of Al in the final body. This allows the densification of bodies initially low in Al to proceed as a result of transfer of Al to the body, changing the Mg to Al ratio to a more favourable level such that densification can proceed. From this it is found that when the lower limit of Al source is used, sufficient pickup and diffusion across the body occurs to enable uniform densification to proceed. For thicker bodies it is not always possible and practical to allow adequate time to effect such diffusion and sufficient pickup. The end result is the production of bodies with porous cores. This may be useful in its own right but this is not always the case and hence an upper limit on the thickness can exist to allow the production of high density bodies. In the process of Kurosaki, the liquid phase is reported to only appear at elevated temperatures. The $SiO_2$ inevitably present on the SiC as an impurity is most likely to be essentially lost from the system and not effectively utilised. In contrast, the present process, demonstrates the advantages of low temperature holds which allow the reaction of MgO and $Al_2O_3$ with $SiO_2$ present. As the temperature is increased to the middle temperature ranges considered, this phase will provide liquid in increasing amounts to effect densification by well known liquid phase sintering processes which involve particle rearrange of SiC grains in the presence of the liquid and secondly by the solution precipitation of SiC. In addition, research has shown that it can be difficult to effect loss of Mg from the compacts during the densification operation especially for samples with thicker cross section or when furnace loadings are high. It has also been found that the decomposition and deposition of Mg in the system can interfere with the operation of the furnace. These factors highlight the problems inherently associated with the use of the spinel as proposed by Kurosaki and the advantages of the processes as disclosed herein.

The SiC powder preferably is substantially free of SiC particles larger than 10 μm and has an average particle size substantially less than 10 μm. Most preferably, the SiC powder has an average particle size less than 2 μm. The SiC powder may comprise α-SiC of any polytype, β-SiC, amorphous SiC, or mixtures thereof.

At least part, preferably a major part, of the required level of the Al source is present in the consolidated body (hereinafter referred to as a "compact") as formed. The Al source in the compact as formed most preferably comprises $Al_2O_3$, in any of its available forms including α- and γ-alumina, although a precursor which generates $Al_2O_3$ on heating can be used instead. Suitable precursors for $Al_2O_3$ include $Al(OH)_3$, $Al(NO_3)_3$, $3Al_2O_3.2SiO_2$, $Al_2O_3.SiO_2$, $AlO(OH)$, organometallic salts of Al including fatty acid salts, other Al compounds which decompose on heating to yield $Al_2O_3$, and mixtures of these compounds with or without $Al_2O_3$.

While it is required that the compact as formed contains at least part of the required level of Al source, it is not necessary that it also contains at least part of the required Mg source. It is preferred that the compact as formed does contain at least part of the required level of Mg source and, to the extent that this is the case, the Mg source most preferably comprises MgO. However, Mg source in the compact may consist of or include a precursor which generates MgO on heating. Suitable precursors for MgO include $MgCO_3$, $Mg(OH)_2$, $Mg(NO_3)_2$, organometallic salts of Mg including fatty acid salts, and mixtures of these compounds with or without MgO.

Al source and Mg source present in the compact as formed preferably are less than 10 μm where comprising a powder. However, at least part of the Al source, the Mg source, or both, need not comprise a powder, such as where comprising an organic precursor material. An Mg source comprising organic material can be beneficial, particularly in the case of a fatty acid salt such as a stearate, able to act as a lubricant in forming the compact. Such organic material can be present in the compact as a film covering powder particles of the compact, rather than as a powder per se.

Part of the required level of the Al source, preferably a minor part, or additional Al source, may be present in the furnace in which the compact is heated. Part or all of the required level of Mg source, or additional Mg source, may be present in the furnace. These conditions can apply as alternatives, or in combination. Al source, Mg source or both so provided in the furnace may be in or comprise a particulate bed on or in which the compact is heated, or it may be in or comprise a coating formed on or around the compact. Al source, Mg source or both present in a bed or coating can be of a powder subject to the same particle size constraints as the SiC. However, such source of the bed or coating can more readily be provided in a greater quantity than is permitted for its presence in the compact, and source of larger particle size, as is preferred, such as in the form of grit of up to 2 mm can be used in the bed or coating.

Whether or not substantially all of the Al and Mg sources are provided in the compact, sintering of the compact most preferably is conducted in the presence of at least one of Al-species and Mg-species in the sintering atmosphere. Such species may be generated by passing a suitable atmosphere containing the species through the furnace from an external supply, by generating the species in the sintering furnace by heating a suitable bed or coating as described above, or by a suitable ratio of compact mass to furnace volume. Use of a bed or coating is preferred, with use of a bed being most preferred. Where a coating is used, it may comprise a coating formed on the compact or on a vessel in which the compact is positioned. The coating most preferably is formed from a slurry containing suitable Al source, Mg source or both, after which a layer of the source is dried to form the coating by low temperature heating.

As made clear in the foregoing, at least part of the Mg source can be present in the compact as formed, and this is preferred. Indeed, it is preferred that at least a major part of the Mg source requirement is present in the compact as formed. Where the compact contains all of the Al source and the Mg source, the compact is formed from a powder mixture containing up to 30 wt % of Al source plus Mg source (calculated respectively as $Al_2O_3$ and MgO), with the balance substantially comprising SiC powder. The amount up to 30 wt % provided by the Al source plus Mg source preferably has quantities of Mg source (as MgO) and Al source (as $Al_2O_3$) such that the ratio of Mg to Al is in the range of 1:2 to 1:25, at levels of 1 wt % to 5 wt % Al source (as Al and in the range of 1:5 to 1:100 at levels of 5 wt % to 25 wt % Al source (as $Al_2O_3$) for increasing contents of Al source in that range of 5 wt % to 25 wt %, the ratio of Mg to Al decreases in a substantially linear manner from 1:2 at 5 wt % to 1:5 at 25 wt % Al source (as $Al_2O_3$).

Where the Al source or the Mg source present in the compact is other than as $Al_2O_3$ or MgO, respectively, it decomposes during heating to the sintering temperature to provide $Al_2O_3$ or MgO and gaseous decomposition products. Such gaseous products readily are able to escape from the compact, at least in the initial stage of the densification process, due to its initial porosity. Where the Al source, the Mg source or each source is provided in a powder bed or in a coating, it decomposes during heating to that temperature, initially to provide $Al_2O_3$, MgO or both where the source respectively is other than $Al_2O_3$ or MgO and generates vapour such as of $Al_2O$, Mg or both in the atmosphere in which sintering is conducted. It is found that the $Al_2O$ or Mg vapour readily is able to permeate the initially relatively porous compact by vapour diffusion, and to generate a suitable source of Al or Mg therein.

A principal role of Al source and Mg source provided in the furnace, such as in a bed or coating, is to generate Al-species and Mg-species which permeate and are taken up in the compact to achieve a desired level of $Al_2O_3$ and MgO in the compact. However, in generating such species, the source provided in the furnace serves a second useful role in generating a substantial partial pressure in the furnace. Evidently due to more rapid heating of the source in the furnace relative to heating of the more dense compact, it appears that the source in the furnace decomposes to provide the species in advance of substantial decomposition of source powder in the compact. The resultant partial pressure of the species appears, as a consequence, to be able to at least partially suppress decomposition of the corresponding source in the compact. In relation to each of these roles, the same result can be achieved by charging to, and maintaining in the furnace, an atmosphere from an external source and containing the required Al-species, Mg-species or both. The atmosphere is produced outside the furnace, such as by heating the required Al source, Mg source or both, maintaining the atmosphere at a temperature sufficient to prevent condensation of the species, and passing the atmosphere through the furnace. Particularly where both Al-species and Mg-species are separately formed, the ratio at which they are present in the atmosphere, as passed to the furnace can be selected. Also, depending on the furnace construction, it is possible to monitor the ratio of the species discharging from the furnace, and the ratio can be adjusted, if appropriate.

If the required Al source and Mg source are both provided in the compact, it still is desirable but not necessary to utilise a bed or coating or to generate Al- and Mg- species by charging these to the furnace in an atmosphere generated externally of the furnace. In this case, $Al_2O_3$ and MgO will tend to decompose and be lost from the compact. This can be offset to a degree by an excess of Al source and Mg source in the compact, to allow for the loss. However, as a more practical alternative to use of a bed, coating or external supply of atmosphere, it can be beneficial to ensure that the mass of compacts densified in the furnace in a given firing is in a favourable ratio to the volume of the furnace. That is, it is desirable that this ratio is such as to ensure that Al- and Mg- species generated by the loss by decomposition gives rise to a vapour pressure which restricts the loss to an acceptable level. In relation to the mass of compacts required, it will be appreciated that this will depend on the mass to surface area ratio of the compacts, while the rate of heating and furnace design are further relevant factors.

While not wishing to be bound by a specific reaction mechanism, it is clearly indicated that MgO has an important role in achieving the beneficial results provided by the process of the invention. Where the Mg source is present in the compact as formed, MgO is present due to use of MgO as the source or is formed in situ by decomposition of a precursor for MgO. In each case, our findings indicate that the MgO forms a transient liquid with $SiO_2$ and $Al_2O_3$ at relatively low temperatures, such as with $SiO_2$ initially present due to surface layer oxidation of the SiC powder. Indications from our research are that such transient liquid forms at from 1300° to 1400° C. While initially present in relatively small volume, the liquid is thought to result in dissolution of other oxides present, such as $Al_2O_3$, causing a substantial increase in liquid volume. Also, while the liquid initially forms at a relatively low temperature, it appears to be stable and such that it is retained at higher temperatures at which a liquid necessarily is to be present for efficient liquid phase densification.

Our research suggests that the transient liquid varies in composition during the course of heating to the sintering temperature, and with holding at that temperature. It seems clear that the liquid initially is substantially of quasi-ternary composition comprising $SiO_2$, MgO and $Al_2O_3$. With increasing temperature above about 1300° C. the liquid takes up further MgO and $Al_2O_3$. At still higher temperatures, with increasing time or both, the $SiO_2$ evidently is progressively lost by decomposition, with at least some loss of MgO also being possible, resulting in an $Al_2O_3$ rich liquid which also can contain at least a residue of MgO. The end result typically is a secondary oxide constituent rich in Al, such as γ or α-Al$_2$O$_3$. The secondary constituent produced in situ can, and typically does, contain Al, but with an Mg to Al ratio of at least 1:3. However, the oxide constituent, despite resulting from the binary liquid phase, readily is able to comprise Al oxide with no detectable Mg content. Moreover, depending on the level of Al source and Mg source initially present in compact as formed, and the extent of control over Al-species and Mg-species in the furnace atmosphere as detailed herein, the temperature and time of sintering can be such that substantially all MgO and thereafter substantially all Al$_2$O$_3$ can be lost, resulting in a sintered product containing little if any detectable oxide constituent. Despite this latter possibility, the process of the invention preferably is conducted such that secondary oxide constituent, with or without a detectable level of Mg, is retained, as such constituent enhances the fracture toughness of the product. The loss of Al$_2$O$_3$ can result in a minor quantity of Al metal being detected in the body. However, despite loss of MgO and decomposition of Al$_2$O$_3$, good densification still is achieved and this and the progressive change in the transient liquid to higher Al to Mg ratios, indicates that the active Al- and Mg-species responsible for densification are retained in the transient liquid phase until densification is substantially complete or at least until densification reaches a level at which another mechanism leads to attainment of a high density body.

Where the Mg source is at least partially present in a bed or coating, Mg vapour is generated and permeates through the compact by diffusion. Furthermore, it appears that oxygen-containing species also are present in the furnace atmosphere. It is thought that the Mg vapour reacts with oxides contained in the compact, to generate MgO in situ, possibly with evolution of SiO. A similar mechanism is believed to occur with Mg vapour comprising Mg- species in an atmosphere passed to the furnace from an external supply. The MgO thus formed results in a low melting point transient liquid with SiO$_2$ and Al$_2$O$_3$, with that liquid then resulting in ongoing dissolution of Al$_2$O$_3$ and increasing in volume as previously explained in relation to the provision of the Mg source in the compact as formed. In addition, it appears that part of the SiO$_2$ initially present in the compact can decompose to form SiO gas and $\frac{1}{2}$ O$_2$, with either the oxygen reacting in the compact with the Mg species to form MgO or the SiO reacting in the compact with those species to form MgO in the presence of other oxygen containing species.

With provision of the Mg source either in the compact as formed, or derived from a powder bed, coating, or an external source of atmosphere, the resultant MgO in the compact is found to act as a flux. That is, the MgO substantially increases the fusibility of Al$_2$O$_3$ and SiO$_2$ and, at low temperatures, forms a transient liquid of sufficient volume which is retained at higher temperatures. The SiO$_2$ is able to form a liquid phase but, in the absence of MgO, SiO$_2$ tends to be lost by decomposition.

The invention also provides a sintered ceramic product, comprising a sintered body having at least 65 wt % SiC with any secondary constituent comprising not more than about 30 wt % secondary oxide constituent, and not more than minor amounts of elemental Al, elemental Si and glassy phase. Any secondary oxide constituent present is rich in Al and may substantially comprise Al oxide. However, the constituent may include Mg, with an Mg to Al ratio of not more than 1:3.

In contrast to the teaching of Kurosaki detailed above, any oxide constituent containing Mg is produced in situ by the use of Al$_2$O$_3$ per se, or a precursor therefor, as distinct from spinel, such that the sintered body is produced by liquid phase sintering resulting from a transient liquid phase produced at relatively low temperatures below that required for sintering.

The product of the invention preferably comprises at least 80 wt % SiC and most preferably at least 85 wt % SiC. However, the SiC content can exceed 98%. At SiC contents of at least 95 wt %, the product can appear to have a microstructure exhibiting only a single phase, or substantially only a single phase, with residual constituents other than SiC evidently being in solid solution in that phase.

The product of the invention typically has a fired bulk density in excess of 2.95 g.cc$^{-1}$. Fired bulk densities in excess of 3.00 g.cc$^{-1}$ readily are able to be achieved, such as in excess of 3.10 g.cc$^{-1}$. Indeed, we have found that such densities of at least 3.15, such as up to and in excess of 3.25 g.cc are possible. Moreover, a good degree of uniformity of fired bulk density, through a sintered body according to the invention, is able to be achieved, while resultant low residual porosity can be substantially as required by control of the level of sintering aid present in the initial compact as formed, the sintering atmosphere and the sintering temperature and time.

The product of the invention also is able to exhibit a high level of fracture toughness, as detailed herein. The fracture toughness increases with increasing level of secondary oxide constituent; frequently, but not necessarily, with corresponding decrease in hardness. However, the hardness typically is in excess of about 18.5 GPa, and can range up to about 26 GPa with significant levels of that constituent present. The higher levels of hardness are possible, particularly with decreasing levels of secondary oxide constituent below about 5 wt % and with lower levels of residual porosity density. Also, as similarly detailed above in relation to residual porosity, it is possible to achieve a required balance between fracture toughness and hardness by control over sintering aid level, sintering atmosphere and sintering temperature and time.

The product of the invention may be formed from a compact containing from about 1 to 25 wt % Al source (calculated as Al$_2$O$_3$) However, it is preferred that the Al source (as Al$_2$O$_3$) is within the range of from 2.5 to 20 wt %. With less than 1 wt %, it is found that useful densification can not be achieved. While useful densification can be achieved with from 1 to 2.5 wt % Al$_2$O$_3$, this can necessitate recourse to closer control over heating conditions, as detailed hereinafter with reference to a mid-temperature hold and/or use of a powder bed which generates a suitable Al species in the sintering atmosphere. It is principally for these latter reasons that the lower limit of 2.5 wt % is preferred.

Where all of the Mg source is provided in the compact, its level of addition (calculated as MgO) may range from about 0.3 to 4 wt %. The preferred range (as MgO) is from about 0.5 to 2 wt %, such as from about 0.5 to 1.5 wt %. With all of the Mg source provided in the compact as formed, a level of addition (as MgO) less than about 0.3 wt %, the Mg source appears not to result in generation of a sufficient level of liquid phase at a low temperature to achieve efficient liquid phase densification, and an inferior level of densification, comparable to that achieved with use of Al$_2$O$_3$ alone, results.

Above 4 wt % (as MgO), the maintenance of such level of Mg in the final sintered product is difficult and, if retained, the Mg source tends to result in too high a level of secondary oxide constituent in the sintered product, with adverse consequences for physical properties. The level of Mg in the secondary oxide constituent and, indeed, the amount of secondary constituent, can be reduced by a longer holding time at the sintering temperature, causing such constituent to be lost by decomposition. However longer holding times have adverse consequences for cost of production and tend also to result in undue loss of SiC.

From the foregoing, it will be appreciated that the starting composition in terms of the Mg source content is related to the Al source content. Alternatively, the overall starting compositions may be expressed in terms of the said Al source content. Thus the Mg to Al ratio is in the range 1:2 to 1:25 at a level of 1 to 5 wt % Al source (as $Al_2O_3$) and from 1:5 to 1:100 at a level of 25 wt % Al source (as $Al_2O_3$) Lines connecting these points define boundaries inside which of the region of useful starting compositions are found.

The above indicated levels of Al source, Mg source or both in the compact can be partially reduced, or fully reduced in the case of Mg source, by providing that source in a bed or coating to generate Al-species, Mg-species or both in the atmosphere. To the extent that this is done, it is difficult to quantify the amount of Al source, Mg source or both to be provided in the bed or coating. The minimum quantity of Al source, Mg source or both necessary in the bed or coating, and resultant permeation of the compact by the Mg-species, can vary with both sintering temperature and the rate of heating to that temperature. Other variables are the thickness of the compact, the volume of the bed or coating, whether or not a mid-temperature hold is employed, the volume of the furnace in which the compact is sintered, and the available surface area of the furnace at which condensation of the species can occur. However, the quantity of Al source, Mg source or each required in the bed or coating can substantially exceed that otherwise required in the compact, such as by a factor of up to 10 or even up to 20. Also, the quantity can be determined in optimising use of each source in a bed or coating by routine analysis of a resultant sample product in a given furnace, and comparison of this with a sample product produced under comparable sintering conditions with each source in its compact. As will be appreciated, each source provided in a bed or coating is required to generate respective species in the furnace atmosphere at a sufficient partial pressure such that there is permeation of the compact by the species. If the compact as formed does not have at least 0.3 wt %, preferably at least 0.5 wt %, of MgO and the required level of $Al_2O_3$ the level of MgO and/or $Al_2O_3$ is to be attained in the compact by permeation. However, the level of MgO in particular, but also that of $Al_2O_3$, can decrease with holding at the sintering temperature.

Instead of use of a powder bed or coating, an external supply of atmosphere to the furnace can be used to provide Al-species, Mg-species or both in the furnace atmosphere. A further alternative is to maintain a favourable ratio of mass of the compact or compacts to the capacity of the furnace in which the firing is conducted, such that significant interaction occurs between individual compacts and between the compacts and the atmosphere. The amount of compacts present relative to that capacity is to be such that loss of the densification aids is limited to an extent such that the densification process is completed in a reasonable time, avoiding resultant products containing a high level of residual porosity. That is, to the extent that the densification aids are lost, they provide a suitable atmosphere in which densification occurs, by generating a sufficient vapour pressure of decomposition products of the densification aids. The relative loss of the densification aids from the compacts (and hence the amount of those aids retained in the compacts compared to that required to stabilise the atmosphere) is thereby reduced by the mass of the compacts and hence of the densification aids initially present. It is preferred that the ratio of the effective furnace volume to the volume of compacts therein be not more than 5 to 1. However, depending on other factors, it can be as high as 10 to 1 or even as high as 20 to 1. The optimum ratio will be dependent on several factors, including the ratio of compact mass to compact surface area, heating rate and overall furnace design.

In general, the balance of the compact after allowance for the Al source and, if provided therein, the Mg source, substantially comprises SiC. Commercial SiC, which typically is used, has a surface layer of $SiO_2$ of up to about 2 wt %. In contrast to some prior art processes for densification of SiC, it is not necessary to reduce or substantially remove such level of $SiO_2$. Indeed, indications are that the $SiO_2$ is beneficial in that, with $Al_2O_3$ and MgO, it is necessary to achieve formation of a stable transient liquid at low temperatures. With a source of SiC with an insufficient level of $SiO_2$, it can be necessary to include a small quantity of $SiO_2$ to the powder mix from which the compact is formed. Also, at least with higher levels of $Al_2O_3$ above about 10 wt %, there can be benefit in adding $SiO_2$ so as to achieve a level thereof in excess of 2 wt %, such as up to about 4 wt %. However, a higher level of $SiO_2$ presupposes that a small proportion of glassy phase can be tolerated in the sintered product, or that the sintering conditions will be such that a glassy phase is obviated by decomposition of the $SiO_2$.

The product of the invention may contain Mg, such as at a level in excess of 0.01 wt %. However, while the Mg level typically is minor, it can be at a level in excess of 0.1 wt % or higher, such as at a level at least 1.5 wt % to about 3.5 wt %. Where Mg is present at a level in excess of an Mg to Al ratio greater than about 1:8, it generally is possible to establish that the Mg is present as an oxide, in combination with Al oxide as an Al rich secondary oxide constituent. Alternatively the product of the invention may be defined in terms of Mg to Al ratios. Thus the Mg to Al ratio is up to 1:3 at a level of 5 wt % Al source (as $Al_2O_3$) and up to 1:6 at a level of 30 wt % Al source (as $Al_2O_3$) Lines connecting these points define boundaries of final composition inside which of the region of useful products are found.

The product of the invention preferably is substantially free of elemental Si. It also preferably is substantially free of a glassy phase. The process of the invention preferably is conducted so as to result in a product in accordance with one, most preferably both, of these requirements. With respect to elemental Si and glassy phase, the upper limit thereof preferably does not exceed about 2 wt % of each.

While preferably substantially free of elemental Si and a glassy phase, the product of the invention may have a secondary oxide constituent as detailed above. Indeed, the presence of such constituent is preferred, particularly where a product having enhanced fracture toughness is required. Sintered SiC produced by prior art pressureless sintering processes typically has a fracture toughness of from 2.5 to 4.0 $MPa.m^{0.5}$, while Si-infiltrated or hot-pressed SiC can have a fracture toughness of from 4 to 5 $MPa.m^{0.5}$. The present invention enables production of a sintered product, that is, one formed by pressureless sintering rather than by Si-infiltration or hot pressing, which has a fracture toughness in excess of the upper limit of 4 $MPa.m^{0.5}$ for conventionally sintered SiC. That is, the present invention enables attainment of a fracture toughness level comparable to, or higher, than that of Si-infiltrated or hot pressed SiC, and significantly better than solid state sintered SiC. A product according to the invention preferably has a fracture toughness in excess of 4, most preferably in excess of 4.5 $MPa.m^{0.5}$, such as in excess of 5.0 $MPa.m^{0.5}$.

The fracture toughness of a product according to the invention increases with the level of secondary oxide constituent present. In general, at least about 4 to 5 wt % of oxide constituent is necessary in order to achieve a fracture toughness in excess of 4 $MPa.m^{0.5}$. Above that level of oxide constituent, fracture toughness can increase to about 4.5 $MPa.m^{0.5}$ and 5.5 $MPa.m^{0.5}$ at oxide constituent levels of about 8 wt % and 15 wt %, respectively. An advantage of the present invention is that it enables the attainment of such level of oxide constituent, and resultant enhanced fracture toughness, for reasons detailed above and in the following.

The fracture toughness values indicated above for the present invention were determined by indentation, using the equation of Antsis et al, *J. Amer. Ceram. Soc.* 64 [9] 533-538 (1981), using a Vickers Hardness diamond indentor and a load of 49N. However, as indicated herein with reference to some Examples, determinations with a standard load of 306.6N, using the equations of Niihara et al, *J. Mater Sci. Letters* 1 (1982) 13-16, for Palmquist and median cracks, give numerically higher values ranging up to at least 5.6 $MPa.m^{\frac{1}{2}}$.

In the above detailed explanation of the mechanism thought to be involved in the process of the present invention, the indicated involvement of MgO is explained. Central to this is the formation of an $MgO—SiO_2—Al_2O_3$ liquid phase at a low temperature, with that liquid being increased in volume by dissolution of further $Al_2O_3$ and being retained to higher temperatures. Despite this, and despite also that the MgO can be formed in situ from Mg species generated in or supplied to the atmosphere, it is found that MgO progressively decomposes and is lost to the sintering atmosphere with still higher temperatures, and time at temperature. While the loss of MgO by this means can be substantially complete, resulting in the low levels of Mg in the product of the invention, the MgO is found to have fully served its function in achieving good densification prior to its loss.

In addition to loss of MgO by its decomposition, it is found that $Al_2O_3$ similarly can be lost by decomposition, as also is the case in the prior art where $Al_2O_3$ is used alone. However, due to the transient liquid phase resulting from the MgO, the loss of $Al_2O_3$ is substantially less than occurs with use of $Al_2O_3$ alone. That is, the activity of Al in solution in the liquid phase is reduced such that decomposition of $Al_2O_3$ tends to occur principally with that portion thereof, if any, which is not taken into solution in the liquid phase. The proportion of $Al_2O_3$, if any, which is not taken into solution is substantially less with use of MgO compared with use of $Al_2O_3$ alone.

Due to any loss of $Al_2O_3$ and also the loss of MgO, the product of the invention can exhibit a weight loss relative to the weight of the compact from which it is formed. Some weight loss also can result from decomposition of SiC and, as the sintered product typically exhibits no detectable elemental Si or glassy phase, it appears that weight loss also occurs by decomposition of $SiO_2$. It appears that the bed or coating, if containing SiC, also serves the purpose of supplying volatile species such as SiO which inhibit the decomposition of SiC in the powder compact. The loss of $Al_2O_3$ can be regulated by generating Al-species in the atmosphere in which the compact is sintered, or by providing an atmosphere containing such species, and this if found to be beneficial. Thus, in one preferred form of the invention, the compact is heated to the sintering temperature in the presence of a bed or coating of an Al-containing material which generates vapour of the Al-species similar to that formed by the decomposition of the $Al_2O_3$ of the compact. On heating of the bed or coating, the $Al_2O_3$ provided or formed therein is decomposed, with its decomposition products providing the required Al-species. The quantity of $Al_2O_3$ decomposed from the bed or coating is such that the Al-species are present at a high partial pressure in the furnace and act to prevent decomposition of the $Al_2O_3$ content of the compact. The principal relevant Al-species is thought to be $Al_2O$.

It appears that generation of Al-species in the atmosphere during sintering regulates the decomposition of $Al_2O_3$ in the compact, at least to the extent of reducing the rate of that decomposition. However, it is possibly only to speculate on this. This is because, although a weight loss from the compact occurs at a higher level in the absence of Al-species being generated in the atmosphere, generation of Al-species in the atmosphere can result in the sintered product having an increased weight percent of Al relative to the SiC content, than was present in the compact from which the product was formed. Thus, there can be a weight gain with respect to aluminium, even allowing for the loss if any of MgO and SiC by sublimation or decomposition. Assuming that the relevant Al-species is $Al_2O$, this evidently permeates the compact prior to full densification and evidently is converted therein to $Al_2O_3$ by reaction with $SiO_2$ of the liquid phase.

The mechanism by which Al-species result in a weight gain with respect to Al appears to be quite distinct from that involved in the transport of Mg-species to the compact where the Mg source at least partially is provided in a bed or coating. That is, it seems clear that the Mg-species comprises elemental Mg vapour, whereas it is quite improbable thermodynamically that decomposition of $Al_2O_3$ will result solely in generation of elemental Al vapour. Generation of $Al_2O$ appears to be substantially more likely, as could be expected from thermodynamic considerations.

Apart from the requirement for generation of Al-species, and also Mg-species where the Mg source is not provided solely in the compact, the atmosphere in which the compact is sintered preferably is inert. Other constituents of the atmosphere may comprise nitrogen, argon, helium or carbon monoxide. The atmosphere has a low oxygen partial pressure as, for example, created by a graphite furnace or carbon in a powder bed or coating.

As detailed above, with reference to a favourable ratio of the mass of the compacts to the furnace capacity, the compacts themselves provide a stable atmosphere conducive to densification. This is accomplished by the amount of densification aids in the compacts at the sintering temperatures being in excess of the limit below which densification will not occur in a reasonable time. The loss of the densification aids to the furnace atmosphere to provide a stable environment is to be such that the amount remaining in the compacts is sufficient to enable the compacts to be densified. This is dependent on the charge of compacts in the furnace chamber and the rate of any effective removal of the active densification aids from the reaction zone.

The process of the invention enables densification over a temperature range of from 1500° to 2300° C. However, over the lower part of that range to about 1700° C, substantially complete densification can necessitate recourse to either application of pressure or an increase in time at temperature, or both. Pressureless sintering is preferred and, under these conditions, the onset of densification for at least preferred compositions is about 1700° C. Rapid densification, enabling a sintering time of about 0.25 to 3 hours at temperature, commences at about 1900° C. The preferred range for sintering temperature is from about 1900° to 2100° C. Sintering temperatures above about 2100° C. tend to increase the extent of loss of $Al_2O_3$, MgO and $SiO_2$ by decomposition, with the loss of $Al_2O_3$ being unable to be offset by Al-species in the atmosphere. However, sintering temperatures of from about 2100° to 2300° C. enable a reduction in the time required at temperature, to less than about 1 hour. Also, depending on the properties required in the end product, substantially complete loss of $Al_2O_3$, MgO and $SiO_2$ can be beneficial.

The indicated role of MgO, in forming a transient liquid phase at a relatively low temperature, is confirmed by the benefit found to be obtained by a mid-temperature hold. As stated above, it appears that the liquid phase initially forms at about 1300° to 1400° C., and is stable and retained at temperatures above that range. A hold in that range, preferably at the upper end thereof, or slightly above that range, is found to enhance the level of densification. It appears that soaking at such mid-temperature range allows the liquid formed to equilibrate, possibly by allowing increased dissolution of $Al_2O_3$ in the liquid and a resultant increase in the volume of the liquid. A hold of from 20 to 180 minutes or more, such as about 60 minutes, typically is sufficient for the purpose of enhancing densification. A similar enhancement can however be achieved by a relatively slow rate of heating to the sintering temperature, such that the compact remains in the temperature range of from about 1200° to about 1550° C. for a period of about 30 to 120 minutes.

The benefit of a mid-temperature soak in enhancing densification similarly tends to confirm that the MgO acts as a flux, facilitating dissolution of $Al_2O_3$ In this regard, it is found that such soak does not provide enhanced densification when $Al_2O_3$ is used in the absence of MgO. Indeed, use of $Al_2O_3$ alone is found to achieve a lesser degree of densification than use of $Al_2O_3$ and MgO in combination, at least in a given time at a given sintering temperature, even where such mid-temperature soak is not used with that combination. The indications are that, as suggested by the $Al_2O_3$—$SiO_2$ binary phase diagram considered above, densification with $Al_2O_3$ alone achieves insufficient liquid necessary for densification by liquid phase sintering, at least until relatively higher sintering temperatures are attained. In addition, at those relatively high temperatures, the tendency for decomposition of $SiO_2$ is increased, thus limiting the potential volume of liquid phase that can be formed. Also, longer sintering times at such higher temperatures are necessary, possibly due to decomposition of $Al_2O_3$ competing with liquid formation.

The Al-species, Mg-species or both, whether by means of a bed or coating in the furnace or from an external supply to the furnace atmosphere, most preferably are generated by heating $Al_2O_3$, MgO or both. However, with use of these or other sources, the source of the species preferably is in particulate form, such as grit or powder. The particulate source most preferably includes particulate SiC, as decomposition of this and generation of Si-species in the atmosphere passed to or generated in the furnace is found to assist in minimising decomposition of SiC in the compact. Also, particulate C in the particulate source is found to be beneficial, with the C having two benefits. First, the C acts to minimise the tendency for the particulate source to fuse into a bonded mass by reducing the tendency for the formation of elemental Si. Second, the C assists with decomposition of the constituents of the particulate source and, hence, generation of Al-, Mg-, and Si-species. As an alternative to use of particulate C, the particulate source can be heated in a carbon box or vessel of other form. However, use of particulate C is preferred.

Where the particulate source is to generate Al-species, but not Mg-species, a suitable source comprises from 10 to 85 wt % SiC, from 1 to 90 wt % C, and from 1 to 50 wt % Al source (calculated as $Al_2O_3$). Where the particulate source is to generate Mg-species, a similar source but in which Mg source (calculated as MgO) is substituted for Al source can be used. Where both Al- and Mg-species are to be generated, a suitable particulate source comprises from 10 to 85 wt % SiC, from 1 to 90 wt % C, and from 1 to 30 wt % of each of Al and Mg source (respectively calculated as $Al_2O_3$ and MgO but not necessarily at the same level of addition).

Our research suggests that the diffusion of Al- and Mg- species into and from the compact can take place through the liquid phase. This acts as a rapid diffusion path. As will be appreciated, diffusion can take place at a greater rate through a liquid or amorphous phase than through the corresponding crystalline form of the same chemical composition. Microstructural studies have revealed that the Al rich secondary oxide constituent involved in the procedure of the present invention is interconnected and can result in a duplex type structure. The observed anomaly where the fired bulk density is high but the residual amount of Mg is low is explained in terms of the microstructure. That is loss of the MgO and $Al_2O_3$ can proceed through diffusion of these species to the surface of the compacts and their subsequent loss through vaporisation. This mechanism can operate in a dense body. The only requirement is that the level of densification aids is sufficient to allow densification to proceed to completion. Thus the observed behaviour is explained. It should also be appreciated that the secondary oxide constituent can exist over a range of Al rich compositions as a solid solution. The flexibility of the ratio of Mg to Al of this phase means that the loss of Mg can be accommodated. This mechanism could also be applied to reduce the amount of secondary oxide constituent after densification of the bodies.

The powders to comprise the compact can be prepared by conventional procedures, as can formation of the compact to a required shape. The powders can be blended by techniques such as wet or dry ball milling. Wet milling can be carried out in water or in a suitable organic fluid, such as iso-propanol. The resultant slurry, containing a required binder as is conventional, then is dried where this is required, such as by spray drying. The powder mix then is formed or compacted into the required shape by conventional ceramic forming techniques, such as uniaxial pressing, isostatic pressing, a combination of uniaxial and isostatic pressing, injection moulding or extrusion, with these techniques being supplemented, if required, by green machining, slip casting, pressure slip casting or tape casting.

When a binder is used, the compact in its green state most preferably is heated slowly to a relatively low temperature, either in the sintering furnace or as a separate operation. This is desirable to effect binder burn-out for removal before the densification step. Such heating preferably is at a temperature of from 300° C. up to 550° C. to 700° C., for a period of from 30 to 90 minutes or more, such as up to 300 minutes. However, the temperature and time can vary, depending on the size of the compact and also on the chosen binder. The heating can be in an oxygen containing atmosphere, such as air, or in an atmosphere substantially free of oxygen, such as argon or nitrogen; a choice on this depending in part on the binder type. For a binder which is burnt out or removed by decomposition, without leaving a residue, either type of atmosphere is acceptable. However some binders, such as those leaving a residue typically of carbon, necessitate use of an oxygen containing atmosphere where, as is preferred, the residue also is to be burnt out.

Where the compact includes an organic precursor of Al source, Mg source or both, this will typically result in a residue in the compact after binder burn-out. However, the benefit of such precursor, such as in acting as a lubricant during powder compaction, will not be offset by such residue. That is, the residue will comprise $Al_2O_3$, MgO or both, able to comprise at least part of the required sintering aids. Also, such residue increases the Young's modulus of the compact after the burn-out, and can also increase its strength, allowing for easier handling and green machining of the compact.

The present invention will be further illustrated by examples in a non-limiting manner. In each of the Examples, dimensions indicated relate to the compact (that is, after shaping or pressing, and prior to cold isostatic pressing where applicable, the unfired green body), while density values are those of the fired body. Also, an organic binder is used in all Examples, at a level of 2 wt % unless otherwise indicated. Additionally, analysis of sintered bodies are based on the assumptions that determinations of C, Al and Mg are respectively attributable to SiC, $Al_2O_3$ and MgO; with resultant minor departures from 100% on aggregate.

EXAMPLES 1 to 6

The raw materials used are shown in Table 1.

TABLE 1

| Raw Material | Starting Materials | | Treatments |
|---|---|---|---|
| | Source | Grade | |
| α SiC | Lonza | UF10/UF15 | — |
| α $Al_2O_3$ | Alcoa | A16SG | — |

TABLE 1-continued

| Raw Material | Starting Materials | | Treatments |
|---|---|---|---|
| | Source | Grade | |
| MgO | Ajax | Analytical Grade | Calcined at 900° C. |

The powders were weighed, and then ball milled with SiC balls. The conditions used are shown in Table 2.

TABLE 2

| Conditions Used for Ball Milling Operation | |
|---|---|
| Time | 16 hours |
| Powder | 300 g |
| Balls | 1500 g |
| Fluid | 600 ml iso-propanol |
| Binder | 2 wt %. |

After milling, the balls were removed and the slurry was subsequently spray dried. The resultant powder mix was uniaxially pressed into cylinders 38 mm diameter and 33 mm high and then cold isostatically pressed at a pressure of about 150 MPa. The samples were then heated in air at 30° C.hr$^{-1}$ to 400° C. and held for 60 minutes to remove the binder.

The samples were covered by a powder bed in a graphite work box. The composition of the powder bed was 76 wt % Sic grit; 19 wt % $Al_2O_3$ powder; and 5 wt % C. The work box was then heated in a graphite resistance furnace in an argon atmosphere. The firing cycle employed is shown in Table 3.

TABLE 3

| Firing Cycle |
|---|
| Ramp at 20° C. min$^{-1}$ |
| Heat to 1400° C. |
| Dwell for 60 minutes |
| Ramp at 5° C. min$^{-1}$ |
| Heat to 2030° C. |
| Dwell for 60 min. |
| Cool at 10° C. min$^{-1}$ |

The results obtained are shown in Table 4. In addition to the details provided therein analysis by XRD techniques revealed an increasing amount of Al rich secondary oxide constituent with increasing initial aluminum content, while no α-$Al_2O_3$ (corundum) was detected. The SiC content in the final body was ascertained, by combustion analysis determination of the C content of the body, assuming all the C was associated with the SiC. The Al and Mg analyses were performed using Atomic Absorption techniques on the fired bodies. The elemental analysis was converted to the equivalent amount of oxide. The Vickers Hardness Numbers were determined employing a load of 5 kg force.

It can be seen that at higher levels of aluminium and magnesium additions in the molar ratio of 2 to 1 good properties were not obtained for the thick bodies of these Examples; compare Example 2 with Example 4. Moreover, the properties were not improved with such ratios having higher levels of MgO. The body of Example 4 was cracked on removal from the furnace. At still higher levels of additions of magnesia (Example 6), the body was cracked and its interior had an inferior hardness number. It is postulated that at high additions of magnesia, its substantial depletion is required to achieve excellent properties. Furthermore, it is speculated that the decrease in properties especially in the interior of thicker bodies could be of a result of the inability of the thicker bodies to substantially deplete the amount of magnesia in order to achieve a favourable aluminium to magnesium ratio in the body. By contrast it is possible to produce bodies with high aluminium to magnesium ratios and maintain excellent physical properties with no cracks being detected after firing (compare Examples 2 and 3). It is speculated that the cracking is caused by either differential sintering of the surface and the interior or differences in the thermal expansion behaviour between the inside and the outside of the bodies as a result of changes in composition during the sintering process caused by an unfavourable Mg to Al ratio in the starting compact.

TABLE 4

Experimental Results

| Composition | Example | | | | | |
|---|---|---|---|---|---|---|
| | 1 | 2 | 3 | 4 | 5 | 6 |
| SiC Surface Area $m^2 \cdot g^{-1}$ | 10 | 10 | 10 | 10 | 10 | 10 |
| Initial $Al_2O_3$ wt % | 3.6 | 10.7 | 23.6 | 10.7 | 20.7 | 17.9 |
| MgO wt % | 1.4 | 1.4 | 1.4 | 4.3 | 4.3 | 7.1 |
| Final SiC wt % | 94.1 | 87.8 | 73.1 | 73.1 | 72.8 | 85.8 |
| $Al_2O_3$ wt % | 4.6 | 12.6 | 24.0 | 20.2 | 24.9 | 13.4 |
| MgO wt % | 0.5 | 1.2 | 1.4 | 3.9 | 4.0 | 2.5 |
| Density $g \cdot cc^{-1}$ | 3.10 | 3.23 | 3.25 | 3.24 | 3.22 | 3.20 |
| Macrocracking | No | No | No | Yes | Yes | Yes |
| Weight change % | −2.8 | −3.1 | −1.5 | −4.7 | −2.4 | −4.3 |
| Vickers Hardness (GPa) - Edge | 24.3 | 27.4 | 23.9 | 25.9 | 20.9 | 25.7 |
| Centre | 13.6 | 24.3 | 22.2 | 20.5 | 21.1 | 14.1 |

EXAMPLES 7, 8 and 8A

Using the procedure of Examples 1 to 6, except as indicated for Example 7 and 8A, discs 75 mm in diameter and respectively 7 mm and 13 mm thick were prepared. The results are shown in Table 5.

TABLE 5

Experimental Results for 75 mm discs 7 mm thick

| Example | 7 | 8 | 8A |
|---|---|---|---|
| Composition | | | |
| SiC Surface Area $m^2 \cdot g^{-1}$ | 10 | 10 | 10 |
| Initial | | | |
| $Al_2O_3$ wt % | 3.6 | 10.7 | 10.7 |
| MgO wt % | 1.4 | 1.4 | 1.4 |
| Final | | | |
| SiC wt % | 92.8 | 86.1 | 84.8 |
| $Al_2O_3$ wt % | 8.1 | 15.6 | 13.3 |
| MgO wt % | 0.01 | 0.01 | 0.5 |
| Density $g \cdot cc^{-1}$ | 3.19 | 3.21 | 3.24 |
| Weight change | −0.7 | −1.1 | −0.8 |
| Vickers Hardness (GPa) | | | |
| Edge | 22.6 | 24.7 | |
| Centre | 23.8 | 24.2 | |
| Fracture Toughness (MPa · $m^{0.5}$) | 4.4 | 5.4 | |

Notes:
(1) For Example 7, heating from 1400° C. to the soak temperature was at 20° C. $min^{-1}$.
(2) Fracture toughness was determined by indentation using the equation of Anstis, Chantikul, Lawn and Marshall, J. Amer. Ceram. Soc. 64 [9] 533-538 (1981), using a Vickers Hardness diamond indentor at a load of 49N.

For Example 7, only SiC and a small amount of Si was detected by XRD. For Example 8, a small amount of α-$Al_2O_3$ (corundum) was detected.

Table 5 illustrates the high level of fracture toughness achievable in a fired body of a sintered SiC product of the invention, and the general tendency for fracture toughness to increase with the level of Al rich secondary oxide constituent. In contrast, commercial HEXOLOY (SiC densified by use of B or a B compound) was found to have a fracture toughness of about 3.1 MPa.$m^{0.5}$ as determined by the Vickers indention method used for Examples 7 and 8, which accords with published data on HEXOLOY.

BRIEF DESCRIPTION OF THE DRAWINGS

Photomicrographs, representative of the microstructure of the sintered body of Example 8A are shown in FIGS. 1 to 3, in which:

FIG. 1 illustrates the form of duplex microstructure obtainable with the present invention. The light coloured constituent comprises Al rich secondary oxide also containing Mg, forming a skeletal structure throughout the sintered SiC. That secondary oxide constituent is not apparent in FIGS. 2 and 3, due to etching, although the equi-axed, rounded grains of sintered SiC are readily apparent. Also apparent is the absence of very fine grains corresponding to finer particle sizes of the SiC powder used, indicative of these having been dissolved in the liquid phase during sintering and precipitation on and between larger particles. Such precipitation also is apparent from the rounded aspect of the SiC grains, and the absence of sharp edges.

EXAMPLES 9 and 10

Figure 1:
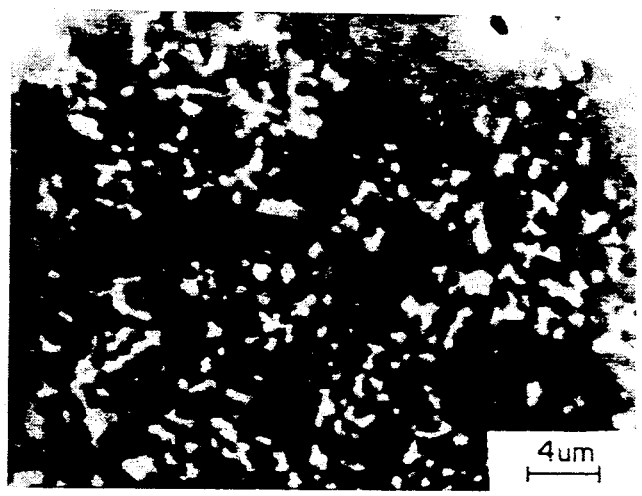
FIG. 1 is a photomicrograph X 2500 of a polished, unetched section.
Figure 2:
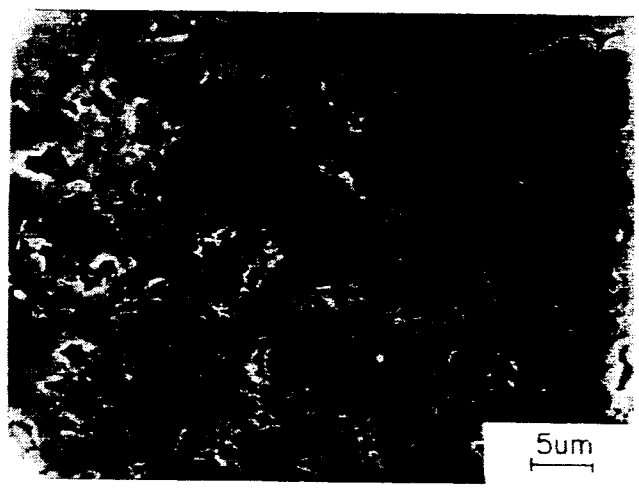
FIG. 2 is a photomicrograph X 2000 of a polished and etched section.
Figure 3:
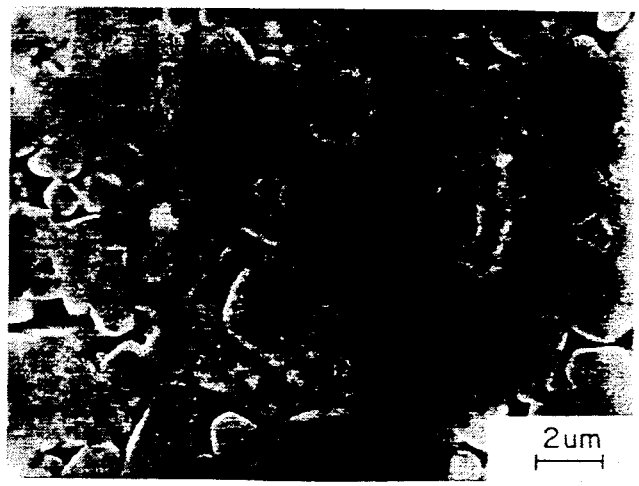
FIG. 3 is similar to FIG. 2 but at X 5000.

In these samples, $Al_2O_3$ (AKPHP) from Sumitomo was the sole sintering aid. The samples were covered by a powder bed in a graphite work box. The powder bed was a blend of 80 wt % SiC grit and 20 wt % $Al_2O_3$ powder. The work box was heated in a graphite resistance furnace in an argon atmosphere. The firing cycle employed is shown in Table 6, and the results are shown in Table 7.

TABLE 6

| Firing Cycle |
|---|
| Ramp at 20° C. $min^{-1}$ |
| Heat to 1400° C. |
| Ramp at 5° C. $min^{-1}$ |
| Heat to 2030° C. |
| Dwell for 60 min. |
| Cool at 10° C. $min^{-1}$ |

TABLE 7

Experimental Results ($Al_2O_3$ Only)

| Example | 9 | 10 |
|---|---|---|
| Composition | | |
| SiC Surface Area $m^2 \cdot g^{-1}$ | 10 | 10 |

TABLE 7-continued

| | Experimental Results (Al₂O₃ Only) | |
|---|---|---|
| Example | 9 | 10 |
| Sample Dimensions | | |
| Diameter mm | 75 | 38 |
| Thickness mm | 7 | 33 |
| $Al_2O_3$ wt % | | |
| initial | 3.6 | 10.7 |
| final | 4.0 | 11.6 |
| Density g · cc⁻¹ | 3.01 | 2.99 |
| Weight change % | −0.9 | −1.3 |
| Vickers Hardness (GPa) | | |
| Edge | 18.5 | 24.4 |
| Centre | 17.3 | 12.3 |

Examples 9 and 10 exhibit an inferior density compared with that obtainable under the same conditions with use of MgO. Also, comprison of Example 10 with Example 9 illustrates a tendency for decreasing uniformity with section thickness and $Al_2O_3$ level.

EXAMPLES 11 to 13

Samples were prepared under different conditions in regards to the powder bed and firing cycle for discs 7 mm thick. Details and results are listed in Table 8.

TABLE 8

| | Experimental Results | | |
|---|---|---|---|
| Example | 11 | 12 | 13 |
| Composition | | | |
| SiC Surface Area m² · g⁻¹ | 15 | 15 | 15 |
| Initial | | | |
| $Al_2O_3$ wt % | 3.6 | 3.6 | 3.6 |
| MgO wt % | 1.4 | 1.4 | 1.4 |
| Composition of Powder Bed | | | |
| SiC wt % | 80 | 73 | 76 |
| $Al_2O_3$ wt % | 20 | 18 | 19 |
| C wt % | 0 | 9 | 5 |
| Firing Cycle | | | |
| Hold at 1400° C. | no | no | yes |
| Density g · cc⁻¹ | 3.10 | 3.15 | 3.21 |
| Weight change | −4.3 | −7.1 | −1.6 |

As shown by Table 8, densification is enhanced by use of C in the bed, and also by use of a mid-temperature hold.

EXAMPLES 14 AND 15

Samples were prepared without MgO in the samples, but with MgO added to the powder bed. The powder bed (composition "A") comprised 75.5 wt % SiC, 19 wt % $Al_2O_3$, 5 wt % C and 0.5 wt % MgO. The conditions were as for Examples 9 and 10, and results are listed in Table 9.

TABLE 9

| | Experimental Results (External MgO) | |
|---|---|---|
| Example | 14 | 15 |
| Composition | | |
| SiC Surface Area m² · g⁻¹ | 10 | 10 |
| Initial - $Al_2O_3$ wt % | 3.6 | 10.7 |
| MgO wt % | 0.0 | 0.0 |
| Final - $Al_2O_3$ | 8.5 | 12.2 |
| MgO | 0.01 | 0.12 |
| Sample Dimensions | | |
| Diameter mm | 75 | 38 |
| Thickness mm | 7 | 33 |
| Composition of Powder Bed | A | A |
| Density g · cc⁻¹ | 3.19 | 3.24 |
| Weight change % | +2.4 | −1.2 |
| Vickers Hardness (GPa) | | |
| Edge | 25.1 | 25.7 |
| Centre | 25.0 | 25.8 |

The use of MgO in the powder bed, when no MgO is initially present in the body, is shown to be useful in producing dense bodies by Examples 14 and 15. From the results it can be seen that the use of MgO in the powder bed has a beneficial effect on the densification and results in the formation of a uniform body of high density. This is in contrast to Examples 9 and 10, when no MgO was present in the reaction zone. In addition, it can be seen that the MgO is effectively retained in the thicker body (Example 14) after the firing process but is lost from the thinner body (Example 15). It appears that this loss occurs after the densification is activated. In any case, it is demonstrated that the use of MgO in the reaction zone allows the fabrication of dense uniform thick bodies as evidence by the fired bulk density and the hardness measurements as compared with when it is not present.

EXAMPLES 16 TO 21

Further Examples 16 to 21 were produced by the procedure of Examples 14 and 15, at various levels of $Al_2O_3$ and with either no MgO or 1.4 wt % MgO in the samples. The powder bed comprised either composition "A", or composition "B" having 76 wt % SiC, 19 wt % $Al_2O_3$, 5 wt % C and no MgO. Other conditions were as in Table 10.

The results of Table 10 make clear that good densification is possible if there is MgO in the reaction zone. MgO in the fired body can be slight, although (taking into account experience where no MgO is present) indications are that MgO taken up by the body initially is at a higher level. Thus, with no MgO detected in Example 18, the indications are that the relatively thin body enables all MgO to be lost after it has activated densification. Particularly in the case of thicker samples of Examples 19 to 21, increasing density with increasing level of $Al_2O_3$ is apparent. As also detailed herein, fracture toughness also increases with increasing content of secondary oxide constituent, such as up to at least 15 wt % of that constituent.

TABLE 10

| | Experimental Results for Discs/Cylinders | | | | | |
|---|---|---|---|---|---|---|
| Example | 16 | 17 | 18 | 19 | 20 | 21 |
| Composition | | | | | | |
| SiC Surface Area m² · g⁻¹ | 10 | 10 | 10 | 10 | 10 | 10 |
| Initial - $Al_2O_3$ wt % | 10.7 | 10.7 | 25.0 | 3.6 | 10.7 | 25.0 |
| MgO wt % | 0.0 | 1.4 | 0.0 | 0.0 | 1.4 | 0.0 |
| Final - $Al_2O_3$ wt % | 16.8 | 17.4 | 30.0 | 5.1 | 14.5 | 25.7 |
| MgO wt % | 0.01 | 0.05 | 0.00 | 0.01 | 1.4 | 0.15 |

TABLE 10-continued

| | Experimental Results for Discs/Cylinders | | | | | |
|---|---|---|---|---|---|---|
| Example | 16 | 17 | 18 | 19 | 20 | 21 |
| Sample Dimensions | | | | | | |
| Diameter mm | 75 | 75 | 75 | 38 | 38 | 38 |
| Thickness mm | 7 | 7 | 7 | 33 | 33 | 33 |
| Composition of Powder Bed | A | B | A | A | B | A |
| Density g·cc$^{-1}$ | 3.19 | 3.18 | 3.15 | 3.15 | 3.23 | 3.29 |
| Weight change % | +2.7 | +2.5 | +6.9 | −0.5 | −0.9 | +0.4 |

EXAMPLES 22 TO 25

Green bodies approximately 130mm square, 19mm thick and weighing about 0.5 kg were produced from a powder mix having 10.7 wt %, 1.4 wt % MgO, 2 wt % binder (as in previous Examples) and the balance comprising SiC. The powder mix was milled as detailed in Table 2, with the resultant slurry then spray dried. The green bodies were prepared by single ended uniaxial pressing at 35 MPa in a 60 tonne press. They then were heated in a flow of air at 30° C.h$^{-1}$ to 400° C. and held at that temperature for 4 hours before cooling at 200° C. hr$^{-1}$ to room temperature.

In respective firings, each of five samples, the green bodies were sintered to produce tiles by heating in an atmosphere of argon or carbon monoxide supplied to the furnace from an external source and passed through the furnace. With each atmosphere, one firing was with a powder bed in the furnace, and another was without such bed. The bed used was the same as described in Examples 1 to 6. In each case, the firing cycle was as set out in Table 11.

TABLE 11

| Summary of Firing Cycles |
|---|
| Heat at 10° C. min.$^{-1}$ to 300° C. |
| Hold until vacuum <200 microns |
| Backfill with Ar or CO |
| Heat at 10° C. min.$^{-1}$ from 300° C. to 1400° C. |
| Hold at 1400° C. for 60 min. |
| Heat at 5° C. min.$^{-1}$ from 1400° C. to 1900° C. |
| Heat at 2.5° C. min.$^{-1}$ from 1900° C. to 2030° C. |
| Hold at 2030° C. for 60 min. |
| Cool at 10° C. min.$^{-1}$ until natural cooling takes over |

For the firings, the green bodies were placed on edge, in a parallel array in a rectangular, graphite work box. The spacing between tiles was about 1 cm, with a spacing of 1.5 cm between the tiles and side walls of the box. Where the powder bed was used, a thin layer of carbon black was provided on the bottom of the box, with about 2 cm of the bed on that layer; with the remaining volume of the box filled with the powder bed so as to result in the bodies being covered to a depth of about 2 cm. Approximately 3 kg of powder bed was used in each firing.

The results obtained with Examples 22 to 25 are set out in Table 12.

TABLE 12

| | | Firing Results | | |
|---|---|---|---|---|
| | | Density (g/cc) | | % Wt. |
| Example | Environment | Green | Fired | Loss |
| 22a | Ar/bed | 1.58 | 3.26 | 0.6 |
| 22b | " | 1.57 | 3.21 | 0.6 |
| 22c | " | 1.56 | 3.19 | 0.5 |
| 22d | " | 1.56 | 3.21 | 0.6 |
| 22e | " | 1.59 | 3.23 | 0.6 |
| 23a | Ar/no bed | 1.54 | 3.17 | 6.4 |
| 23b | " | 1.55 | 3.19 | 4.0 |
| 23c | " | 1.53 | 3.18 | 3.7 |
| 23d | " | 1.54 | 3.18 | 3.9 |
| 23e | " | 1.55 | 3.17 | 6.5 |
| 24a | CO/bed | 1.55 | 3.21 | 1.2 |
| 24b | " | 1.55 | 3.17 | 1.2 |
| 24c | " | 1.56 | 3.15 | 0.8 |
| 24d | " | 1.56 | 3.16 | 1.0 |
| 24e | " | 1.56 | 3.20 | 1.5 |
| 25a | CO/no bed | 1.54 | 3.21 | 5.2 |
| 25b | " | 1.55 | 3.21 | 3.4 |
| 25c | " | 1.56 | 3.22 | 3.6 |
| 25d | " | 1.55 | 3.22 | 3.5 |
| 25e | " | 1.55 | 3.23 | 5.4 |

Examples 22 to 25 show good densification, obtained with an atmosphere of argon or carbon monoxide, with or without a powder bed (or comparable external source of Al-species or Mg-species).

Chemical analyses were performed by taking a vertical, cross-sectional slice from selected tiles of each firing of Examples 22 to 25, and analysing top, middle and bottom portions of the slice. The results are detailed in Table 13.

TABLE 13

| | | Chemical Analyses (Wt %) | | |
|---|---|---|---|---|
| Example | Region | SiC | Al$_2$O$_3$ | MgO |
| 22c | Top | 80.6 | 14.3 | 1.0 |
| | Middle | 84.8 | 10.3 | 0.7 |
| | Bottom | 82.9 | 13.5 | 0.8 |
| 23c | Top | 86.5 | 11.0 | 1.0 |
| | Middle | 84.5 | 10.7 | 1.0 |
| | Bottom | 85.8 | 11.0 | 1.0 |
| 24c | Top | 83.6 | 13.1 | 0.6 |
| | Middle | 86.4 | 9.2 | 0.3 |
| | Bottom | 84.2 | 11.8 | 0.5 |
| 25b | Top | 86.4 | 11.1 | 0.7 |
| | Middle | 85.8 | 11.1 | 1.0 |
| | Bottom | 88.1 | 11.1 | 0.9 |

The results of Table 13 shows good overall results are obtainable with an atmosphere of argon or of carbon monoxide. The tiles show increasing levels of Al and, to a lesser extent, of Mg (taken respectively to be Al$_2$O$_3$ and MgO in the secondary oxide constituent) from the centre of each tile toward its top and bottom, due to the use of a powder bed. This composition variation is not found to have adverse consequences for the physical properties of the tiles. It is attributed to the relatively large mass of tiles in each firing to the effective furnace volume, and the close confinement of samples in the work box but can be minimised by reducing the quantity of powder bed or its composition, the initial level of sintering aid or a combination of these factors. While a powder bed can be beneficial, as evidenced by earlier Examples, Table 13 shows that use of a bed can be obviated.

EXAMPLES 26 TO 29

Further discs, 75 mm diameter and 7 mm thick were produced using either α-SiC powder as in the previous Examples, with β-SiC powder (ex-Stark), or with a mixture of these α- and β-SiC powders. Green bodies for the tiles were prepared from a powder mix of 10.7 wt % $Al_2O_3$, 1.4 wt % MgO, 2 wt % binder, the balance SiC. The powder was milled, spray dried and compacted as described in Examples 1 to 6, except that the mix for Example 28 was prepared by blending separate α- and β-spray dried powder mixes. The resultant green body compacts then were sintered, using a powder bed and firing cycle as specified in Examples 1 to 6. The results obtained are summarised in Table 14.

TABLE 14

| | | α- and β-SiC Evaluation | | |
|---|---|---|---|---|
| | | Density g/cc | | % Wt |
| Example | SiC Type | Green | Fired | Change |
| 26 | α | 1.72 | 3.23 | +0.4 |
| 27 | 50α/50β | 1.79 | 3.21 | +0.9 |
| 28 | 25α/75β | 1.81 | 3.07 | +0.1 |
| 29 | β | 1.86 | 3.05 | −1.2 |

The green density increased with increasing β content, consistent with the lower packing density of the α-SiC powder used. The use of 50:50 α- and β-SiC resulted in an excellent fired bulk density. The use of β-Sic alone and the 25:75 mechanical mix of spray dried α-SiC and β-SiC produced relative lower fired densities. However, the use of β-Sic has not been optimised and these lower densities are attributed to this, as opposed to any intrinsic property of β-SiC. No significant differences between use of α- and β-SiC were observed on the basis of chemical analyses of the discs, and the lower densities with 25:75 α- plus β-SiC and with β-SiC along are not attributed to differences in final composition of the discs.

EXAMPLES 30 to 34

Discs approximately 75 mm diameter and about 7 mm thick, were produced from a powder mix having 10.7 wt % $Al_2O_3$, 1.4 wt % MgO, 2 wt % binder and the balance of SiC. The powder mix was milled, dried and compacted, and the resultant green body compacts then sintered as specified for Examples 1 to 6, except as detailed herein. In some instances the milling was in water, rather than isopropanol. Also, in one instance of milling in water, the milled slurry was pan dried, rather than spray dried. In some cases, the dried powder was sieved, before compaction. Powder preparation is detailed in Table 15, while firing results are shown in Table 16.

TABLE 15

| | Powder Preparation Processing | | |
|---|---|---|---|
| Example | Milling Fluid | Drying Process | Secondary Treatment |
| 30 | Water | Spray | Nil |
| 31 | Water | Spray | Sieved |
| 32 | Isopropanol | Spray | Nil |
| 33 | Water | Pan | Sieved |
| 34 | Isopropanol | Spray | Sieved |

TABLE 16

| | Results with TABLE 15 Processing | | |
|---|---|---|---|
| Example | Thickness mm | Density Fired (g/cc) | % Wt Loss |
| 30 | 25 | 3.20 | 2.16 |
| 31 | 25 | 3.19 | 2.20 |
| 32 | 5 | 3.21 | 3.44 |
| 33 | 25 | 3.21 | 3.26 |
| 34 | 25 | 3.20 | 2.72 |

The fired bulk density of all discs was high; there being no significant differences in Examples 30 to 34 to be attributed to the different fabrication routes. That is, it was found that milling in water is essentially comparable to that in isopropanol. The relatively high weight losses were attributed to a temperature measurement problem. Milling in water necessitates a higher drying temperature, tending to increase the formation of agglomerates. Thus, while sieving has not been found to be necessary with milling in isopropanol, it is indicated as desirable after drying of powder milled in water.

EXAMPLES 35 TO 39

In these further Examples, discs comparable to those of Example 8 where prepared, in general by the procedure of that Example. The extent to which each of Example 35 to 39 was the same as or different from Example 8 is set out in Table 17.

TABLE 17

| | Relativity to Example 8 |
|---|---|
| Example | Comment |
| 35 | The α-SiC used was Lonza UF10, rather than UF15 as in Example 8. |
| 36 | The α-SiC was black Acheson SiC of 10 $m^2/g$ and not less than 97% purity, rather than green Acheson SiC of not less than 98% purity for Example 8 |
| 37 | As for Example 36, plus the disc in its green state was 105 mm square and 12 mm thick, and formed by uniaxial pressing at 80 $MN/m^2$. Also, the powder was milled in water with 4 wt % binder and agglomerated, with green body binder burn-out at 500° C. for 4 hr. |
| 38 | As for Example 37, but with aqueous milling of the powder with 4 wt % binder. Also, the powder was blended with 1 wt % magnesium stearate as lubricant to provide after burn-out, additional MgO. |
| 39 | As for Example 36, plus the disc was 20 × 40 × 5 mm and formed by injection moulding, using 18.5 wt % binder. Also, powder milling was in water, with 1 wt % Mg-stearate included as in Example 38. Burn-out was by heating to 600° C. in an inert atmosphere to char the binder, followed by heating in air at 550° C. for 1 hr. to complete binder removal. |

The densities, hardness and fracture toughness of the resultant tiles produced by Examples 35 to 39 are summarised in Table 18. The results detailed in Table 18 for fracture toughness ($K_{IC}$) were by indentation, as determined with a standard load of 306.6N according to Niihara et al referred to above. The 1/a values do not allow association to particular crack types and the $K_{IC}$ values have been calculated for both the Palmquist type (in parenthesis) and the median type. The median type is more likely for the load used and the fracture toughness values obtained.

TABLE 18

| Example | Physical Properties | | |
|---|---|---|---|
| | Density as Fired (g/cc) | Hardness (GPa) | $K_{IC}$ MPa·m$^{0.5}$ |
| 35 | 3.24 | 20.1 | 5.5 (6.6) |
| 36 | 3.21 | 19.9 | 5.6 (6.6) |
| 37 | 3.19 | 19.5 | 5.3 (6.5) |
| 38 | 3.23 | 19.9 | 5.2 (6.7) |
| 39 | 3.19 | 18.6 | 5.6 (6.8) |

When B and C are used as sintering aids for black SiC of not less than 97% purity SiC, the higher Al content of that grade of SiC is found to result in excessive grain growth. In practice, it is extremely difficult to control the sintering cycle to avoid this. However, the tiles produced with Examples 36 to 39, each using such commercial SiC, were found to exhibit a microstructure of uniaxed grains of less than 5 μm. Also, as shown by Table 18, the tiles produced with that material were found to have similar fired bulk densities, hardness and high fracture toughness properties as obtained with more expensive green SiC of not less than 98% purity used for the tile of Example 35. These findings, attributed to the quite different sintering mechanism characterising the present invention, are of significance given the cheaper and more readily available less pure grade of SiC.

Examples 35 to 39 also further illustrate the excellent level of densification obtainable with the present invention, as well as the level of hardness and level of fracture toughness. These Examples further illustrate the ability of the process to accommodate different methods of compact preparation, both in respect of powder milling by aqueous and non-aqueous media, and of methods of compaction. Examples 38 and 39 also illustrate the ability to utilise organic salts as lubricants, with these in the case of Al- or Mg- fatty acid salts able to serve a second role, after burn-out, of providing at least part of the required level of Al or Mg source of densification aid.

EXAMPLES 40 TO 49

In the above Examples, unless indicated to the contrary, the compacts were prepared with 2 wt % organic binder, with binder removal as detailed in Examples 1 to 6. Thus, in general, binder removal was conducted by heating the compacts in a flow of air at 400° C. for 60 minutes. The present further Examples provide a comparison between this and use of an inert atmosphere rather than air, with argon selected as the inert atmosphere.

Discs 75 mm in diameter and either 7 mm or 13 mm thick were prepared, in each case with 10.7 wt % Al$_2$O$_3$, 1.4 wt % MgO, organic binder and the balance of SiC. In Examples 40 to 44 and 49, green Acheson SiC of not less than 98% purity was used with 2 wt % binder, while in Examples 45 to 48, black Acheson SiC of not less than 97% purity was used with about 7.5 wt % organic binder and about 1 wt % Mg-stearate. For Examples 40 to 44 and 49, the powders were milled and spray dried as for Examples 1 to 6 while, in the case of Examples 45 to 48, the powders were agglomerated.

Example 41 was subjected to binder removal in air in accordance with the procedure for Examples 1 and 6, to provide a reference for comparison purposes. The others of Examples 40 to 49 were subjected to binder removal in argon, as detailed in Table 19.

TABLE 19

| Binder Removal in Argon |
|---|
| Heat to 160° C. at 30° C. h$^{-1}$ |
| Dwell at 160° C. for 60 min. |
| Heat 160° C. to 250° C. at 30° C. h$^{-1}$ |
| Heat 250° C. to 450° C. at 12° C. h$^{-1}$ |
| Heat 450° C. to 600° C. at 30° C. h$^{-1}$ |
| Dwell at 600° C. for 3 hr. |

Cool at 200° C.h$^{-1}$ until material cooling takes over.

Each of the discs of Examples 40 to 49, after binder removal, were sintered in a heating cycle, with backfeed with argon, as detailed in Table 11. In this, the discs were in two batches of 5 discs, using a graphite work box for each batch and a powder bed as detailed for Examples 22 to 25.

Prior to binder removal, the green bodies with higher binder content were relatively weak and required careful handling. Their strength was improved after binder removal, while binder removal was satisfactory for all Examples, indicating the ability to use an inert atmosphere in this operation. However, a higher weight loss occurred in this operation with Examples 45 to 48 due to their higher binder content. The weight loss for Examples 45 to 48 was about 8.4% compared with 1.8% for Example 41 (binder removal in air) and about 2.3% for Examples with lower binder content removed in argon.

Results obtained with the fired discs are set out in Table 20.

TABLE 20

| | Firings with Binder Removal in Ar | | |
|---|---|---|---|
| | Density (g·cc$^{-1}$) | | |
| Example | Green | Fired | % Wt. Change |
| 40 | 1.72 | 3.18 | −0.37 |
| 41 *1 | 1.73 | 3.09 | −0.04 |
| 42 | 1.70 | 3.06 | −0.72 |
| 43 | 1.70 | 3.10 | +2.44 |
| 44 | 1.71 | 3.18 | −0.14 |
| 45* | 1.90 | 3.16 | −0.47 |
| 46* | 1.89 | 3.11 | −0.25 |
| 47* | 1.88 | 3.09 | −1.36 |
| 48* | 1.88 | 3.11 | −0.38 |
| 49 *2 | — | 3.21 | −0.10 |

*higher binder content, all other lower binder content
*1 - burn out in air, all others in argon
*2 - green disc 13 mm thick, all others 7 mm thick.

The disc of Example 43 was broken on removal from the work box and the cause of this anomaly is unclear. However, apart from this, the overall results were satisfactory, with similar densities being obtained regardless of differences in binder removal atmosphere and binder content. The densities were lower on average than for most other Examples, and it is speculated that this is due to the quantity of powder bed in combination with the work box size and disc configuration.

COMPARATIVE EXAMPLES (FROM LITERATURE)

In Table 21, there is set out selected detail of comparative specific examples from Suzuki et al (U.S. Pat. No. 4,354,991), as well as results detailed in the above-mentioned article by Omori et al. The detail from Suzuki et al is from their Examples 1 to 3 based on use of β-SiC and Example 6 based on α-SiC; the sole sintering aid in each case being Al$_2$O$_3$. The detail from Omori et al is in respect of use of Al$_2$O$_3$ alone, or in combination with Y$_2$O$_3$, as sintering aid.

TABLE 21

Literature Results

| Suzuki et al Composition | | | | |
|---|---|---|---|---|
| SiC - area $M^2 \cdot g^{-1}$ | 13 | 13 | 13 | 7 |
| $Al_2O_3$ - initial wt % | 25 | 15 | 3 | 13 |
| $Al_2O_3$ - final wt % | | | not given | |
| Temperature °C. | 2000 | 2000 | 2000 | 1950 |
| Time min. | 300 | 300 | 300 | 300 |
| Density $g \cdot cc^{-1}$ | 3.06 | 3.11 | 3.13 | 3.13 |
| Omori et al Composition | | | | |
| SiC - area | | not given | | |
| $Al_2O_3$ - initial wt % | | 10 | | 5 |
| $Y_2O_3$ - initial wt % | | 0 | | 5 |
| $Al_2O_3$ - final wt % | | 1.5 | | 1.0 |
| $Y_2O_3$ - final wt % | | 0 | | 2.1 |
| Temperature °C. | | 2100 | | 2100 |
| Time min. | | 30 | | 30 |
| Density - $g \cdot cc$ (estimate) | | 2.4 | | 3.1 |

Fired bulk densities obtainable with the present invention are shown in Tables 4, 5, 8, 9, 12, 14, 16, 18 and 20. The results indicate that increasing the addition of oxides, increases the fired bulk density. This is unexpected and in stark contrast with the findings of Suzuki et al (Table 21) where the opposite trend was observed. In addition, the times reported to reach a significantly higher fired bulk density were much longer (see Table 21). In the work of Omori et al, the addition of $Al_2O_3$ only was ineffective for the attainment of high fired density bodies. It appears that the difference in the results of Omori et al and Suzuki et al is due to use of a powder bed in the work of Suzuki et al. Furthermore, the use of MgO as disclosed herein, provides a very stable liquid which is able to retain the active densification aids which in turn greatly enhances the observed fired bulk density of products especially when higher levels of $Al_2O_3$ are employed.

At lower levels of oxide addition (see Example 1), the samples had higher levels of porosity in the centre. This is illustrated by the lower levels of hardness obtained in the centre as compared to the edge. The higher porosity was confirmed by microscopy. A similar observation was made at the higher levels of magnesium addition (see Example 6).

It is important to note, that for thinner cross sections, it was possible to densify samples containing lower levels of oxide additive (see Example 7). From the hardness determination, it can be seen that there was no significant difference in the hardness for the edge and centre regions indicating the sample was uniform with respect to porosity. This is in contrast to Example 1.

It is an observed feature that the aluminium content of the body can increase during densification and this greatly facilitates densification. It is anticipated that both aluminium and oxygen are supplied to the body from the powder bed or an external source.

When high levels of both oxide additives are employed, the additives are essentially retained. This is in contrast to the work of Omori et al, where the densification aids are essentially lost. This is attributed to the greater stability of the procedure and the densification aids as disclosed herein.

When alumina only is used as a densification aid, the result is inferior to the combined use of alumina $Al_2O_3$ and MgO (see Examples 9 and 10). The fired bulk densities obtained after 60 minutes at the maximum temperature were significantly lower than when MgO was also employed. The hardness values of these examples was significantly lower compared to Examples 7 and 2 respectively. This demonstrates the profound and advantageous effect of the use of both $Al_2O_3$ and MgO on the densification process.

The effect of the addition of C to the powder bed is demonstrated for Examples 11 and 12. The result was a significant increase in the fired bulk density with the addition of C to the bed. The beneficial effect of a low temperature dwell is also shown by comparison of Examples 12 and 13. It is suggested that the improved density is the result of the formation of stable phases at these temperatures which allow the retention of the sintering aids at high temperatures thereby facilitating densification.

The use of MgO in the powder bed (or in an externally generated atmosphere charged to the furnace), when no MgO is initially present in the body, was shown to be useful in producing bodies (see Example 14). From the results it can be seen that the use of MgO in the powder bed has a beneficial effect on the densification and results in the formation of a uniform body of high density. This is in contrast to Example 10, when no MgO was present in the reaction zone of the sintering furnace.

Densified bodies can be successfully produced without the use of a powder bed, coating or external atmosphere supply when certain criterion of sample to furnace reaction zone ratio, furnace type, atmosphere and heating rate are satisfied. This has the added advantage of a more simple process, and improved surface finish for the production of bodies. The process is essentially unchanged from the case of the powder bed with respect to the finished product.

As is evident from the foregoing, the present invention provides a dense SiC product, and a process for its production, which obviates the need for use of B, or a B-compound, plus C. The invention is not characterised by problems of uncontrolled grain growth associated with such prior art proposal, or degradation of physical properties which result from residual C in the product. Indeed, exaggerated grain growth is not a feature of the present process. Although there is ample evidence of solution precipitation on SiC grains occurring in the process of the invention, it appears that the solubility of SiC in the transient liquid phase obtained in the process of the invention is low and that the interfacial energy balances are favourable. In the process of the invention, very fine SiC particles of the compact are dissolved in that liquid and thereafter the dissolved SiC precipitates on larger SiC particles to provide a densified product having fine, uniform equi-axed SiC grains which, on average, typically are less than 5 μm in size.

The invention enables liquid phase pressureless sintering of SiC. It thus overcomes the inherent technical and economic disadvantages of the use of temperature and pressure for the attainment of dense bodies. Liquid phase sintering promotes much greater mobility of species over much larger distances. It can overcome problems in trying to obtain a homogeneous dispersion of additives in a powder mixing step and can assist in the elimination of defects especially those greater than the characteristic grain size of the starting powders.

Also, the presence of $SiO_2$ as a surface layer on the SiC does not present a problem with the invention. Thus, it is not necessary to pre-treat the SiC, such as by washing in HF, or to add C to achieve removal of the $SiO_2$ by reaction. In this regard, it is worth noting that SiC is thermodynamically unstable in relation to $SiO_2$. That is on exposure to air (and especially in the presence of moisture) SiC is oxidised to $SiO_2$. The oxidation mechanism is a passive one in that a protective oxide layer is formed. As a consequence of this is that SiC in a highly divided form, such as a powder, can contain an appreciable level of oxygen on the surface. Typically levels of oxygen are 0.6 wt % for a powder with a surface area of 10 $m^2.g^{-1}$. Powders with smaller particle sizes have an increased oxygen content, and a practicable limit to the use of extremely fine powders can result from $SiO_2$ contamination. For the conventional pressureless sintering route there is a limit to the amount of $SiO_2$ that can be tolerated. It is generally believed that the use of C in these materials is required to remove the surface silica from the silicon carbide powder. According to a U.S. Pat. No. 4,123,286 to Coppola et al, the maximum $SiO_2$ content is 2.0 wt % (equivalent to 1.1 wt % oxygen) with a preferred maximum of 0.5 wt % $SiO_2$ (equivalent to 0.3 wt % oxygen). This level is below typical levels found on commercial SiC powders. While the oxide layer can be removed or reduced in amount, this introduces another processing step and the powder can be "re contaminated" with respect to oxygen by exposure to the atmosphere or during the process to produce dense fabricated bodies.

Moreover, while the use of oxides to densify SiC by pressureless sintering techniques has previously been disclosed, their use has been associated with several disadvantages. Thus the presence of $Al_4O_4C$ and $Al_2OC$ in the final product, either by their deliberate addition or formation, results from the use of CaO and $Al_2O_3$ additives during the densification, but such oxycarbides are highly reactive especially with water and moisture and should be avoided. Also, compared to the use of $Al_2O_3$ (or $Al_2O_3$ precursor) alone, the present invention provides for shorter reaction times and higher fired bulk density bodies, with a much higher production rate for a given furnace volume and lower energy costs. In addition, with use of $Al_2O_3$ (or its precursors) alone as the densification aid, increasing the amount of the $Al_2O_3$ results in a decrease in the reported fired bulk density, whereas in the present invention there is no such observed decrease. This means that it is possible to substitute some of the expensive SiC powder with lower cost oxide additives thereby reducing the cost of producing product without impairing the fired bulk density as well as increasing fracture toughness by incorporating an oxide secondary phase. The use of $\beta$-SiC powders, as is preferred with use of $Al_2O_3$ alone, is avoided by the present invention. Also the present invention does not necessitate the use of SiC of highest purity levels, since commercial SiC of not less than 95% purity can be used.

The liquid phase sintering of SiC enabled by the present invention is believed to be such that other non-oxide and refractory oxide constituents can be incorporated. Thus, it is speculated that for example $B_4C$ or carbides or borides of the transition metals such as TiC, $TiB_2$ or TaC can be incorporated in the form of particles, platelets or whiskers. Also, it is speculated that SiC as particles larger than 10 μm, such as resulting from a bimodal grain size distribution, or as platelets or whiskers, can be incorporated. Similarly, it is speculated that refractory oxides, such as partially or fully stabilised, or unstabilixed, $ZrO_2$ can be incorporated. In each case, incorporation of such constituents in a matrix of sintered SiC according to the invention is envisaged.

Finally, it is to be understood that various alterations, modifications and/or additions may be introduced into the constructions and arrangements of parts previously described without departing from the spirit or ambit of the invention.

I claim:

1. A process for the liquid phase sintering of silicon carbide, comprising the steps of:
   forming a shaped, consolidated powder body which, not allowing for binder, comprises a powder mixture containing at least 75 wt % silicon carbide and from 1 to 25 wt % (calculated as $Al_2O_3$) of a powder comprising a source of aluminum selected from alumina, precursors for alumina, and mixtures thereof, particles of the silicon carbide powder of said mixture having a surface layer of silica; and
   heating the body to a sintering temperature of from 1500° C. to 2300° C., in an atmosphere which is substantially non-oxidizing at said sintering temperature, to form in said heating step a liquid phase and a resultant liquid phase sintered body;
   the body, in said heating step, being heated in the presence of a source of magnesium which is distinct from the source of aluminum and comprises at least one of magnesia, precursors for magnesia, magnesium vapor and combinations thereof, whereby said liquid phase achieves a transient ternary composition in which it contains silica, magnesia and alumina and produces secondary oxide constituent, said liquid phase being such that the sintered body is essentially free of oxycarbide.

2. A process according to claim 1, wherein said silicon carbide powder is substantially free of particles larger than 10 μm and has an average particle size substantially less than 10 μm.

3. A process according to claim 2, wherein said silicon carbide powder has an average particle size less than 2 μm.

4. A process according to claim 1, wherein said silicon carbide has a purity of not less than 97%.

5. A process according to claim 1, wherein said silicon carbide has a purity of not less than 98%.

6. A process according to claim 1, wherein said silicon carbide powder comprises at least one of α-phase silicon carbide of any polytype, β-phase silicon carbide, amorphous silicon carbide and mixtures thereof.

7. A process according to claim 1, wherein said aluminum source is selected from aluminum oxides, aluminum hydroxide, aluminum monohydrate, aluminum nitrate, aluminum silicates, organo-metallic salts of aluminum comprising precursors for aluminum oxide, and mixtures thereof.

8. A process according to claim 1, wherein said magnesium source is selected from magnesium oxide, magnesium hydroxide, magnesium carbonate, magnesium nitrate, organo-metallic salts of magnesium comprising precursors for magnesium oxide, and mixtures thereof.

9. A process according to claim 8, wherein said body as formed includes at least portion of a required level of a magnesium source.

10. A process according to claim 9, wherein said magnesium source comprises an organo-metallic salt of magnesium.

11. A process according to claim 10, wherein said salt of magnesium is a fatty acid salt which, in addition to providing said source, acts as a lubricant in formation of the compact.

12. A process according to claim 11, wherein said fatty acid salt is magnesium stearate.

13. A process according to claim 1, wherein said body contains up to 30 wt % in total of said sources of aluminum and magnesium, calculated respectively as $Al_2O_3$ and MgO, to provide a ratio of Mg to Al source (as $Al_2O_3$ in the range from 1:2 to 1:100, with the balance apart from binder substantially comprising silicon carbide.

14. A process according to claim 13, wherein there is from 1 to 5 wt % Al source (calculated as $Al_2O_3$) and said ratio is from 1:2 to 1:25.

15. A process according to claim 13, wherein there is from 5 to 25 wt % Al source (calculated as $Al_2O_3$) and said ratio is from 1:5 to 1:100.

16. A process according to claim 13, wherein said ratio of Mg to Al is from 1:2 to 1:50.

17. A process according to claim 1, wherein the body contains from 2.5 to 20 wt % of said aluminum source (calculated as $Al_2O_3$).

18. A process according to claim 1, wherein the body contains from 0.3 to 4 wt % of said magnesium source (calculated as MgO), said source being selected from magnesia, precursors for magnesia and mixtures thereof.

19. A process according to claim 18, wherein said body contains from 0.5 to 2 wt % of said magnesium source (calculated as MgO).

20. A process according to claim 18, wherein said body contains from 0.5 to 1.5 wt % of said magnesium source (calculated as MgO).

21. A process according to claim 1, wherein the body is heated in said heating step in the presence of an atmosphere containing at least one of an aluminum containing vapour species and magnesium vapour at a vapour pressure whereby the alumina and magnesia content, respectively, of the oxide phase is controlled.

22. A process according to claim 21, wherein said body as formed is substantially free of said magnesium source, and said atmosphere contains magnesium vapour at a vapour pressure sufficient to cause said vapour to permeate through the body and thereby form said oxide phase.

23. A process according to claim 21, wherein said body is heated in said heating step in the presence of a particulate bed containing at least one of said aluminum source and said magnesium source, whereby the respective said aluminum-containing vapour species and said magnesium vapour is generated in said atmosphere during said heating step.

24. A process according to claim 23, wherein said bed contains both an aluminum source and a magnesium source provided by particulate material comprising a blend of alumina and magnesia.

25. A process according to claim 23, wherein said bed contains particulate silicon carbide.

26. A process according to claim 23, wherein said bed contains particulate carbon.

27. A process according to claim 21, wherein said at least one of aluminum-containing vapour species and magnesium vapour is provided by flow thereof, from an external supply, through a furnace in which heating step is conducted.

28. A process according to claim 27, wherein said external supply is generated by heating outside said furnace a particulate material containing both an aluminum source and a magnesium source provided by particulate material comprising a blend of alumina and magnesia.

29. A process according to claim 21, wherein said body in said heating step is heated in the presence of a coating formed of particulate material and containing at least one of said aluminum source and said magnesium source, whereby the respective said aluminum containing vapour species and said magnesium vapour is generated in said atmosphere during said heating step.

30. A process according to claim 29, wherein the body is at least partially enclosed in said coating.

31. A process according to claim 29, wherein said coating contains both an aluminum source and a magnesium source provided by particulate material comprising a blend of alumina and magnesia.

32. A process according to claim 29, wherein said coating contains particulate silicon carbide.

33. A process according to claim 29, wherein said coating contains particulate carbon.

34. A process according to claim 21, wherein said at least one of aluminum vapour species and magnesium vapour is generated by partial loss and decomposition of aluminum source and magnesium source, respectively, from the body during heating in said heating step wherein the ratio of the mass of the body or bodies to the effective capacity of a furnace in which the heating step is conducted is such that said vapour pressure is generated by said decomposition and is such that the extent of Said loss is limited by said ratio and does not impair formation of said liquid phase and attainment of said resultant liquid phase sintered product.

35. A process according to claim 1, wherein in heating to said sintering temperature, the body is retained in the temperature range of 1200° C. to 1550° C. for a period of from 30 to 120 minutes whereby formation of said liquid phase is enhanced.

36. A process according to claim 1, wherein said sintering temperature is in the range of 1900° C. to 2100° C.

37. A process according to claim 1, wherein the heating step is conducted at the sintering temperature for a period of from 0.25 to 3 hours.

38. A process according to claim 1, wherein said oxide is retained in the body on completion of said heating step.

39. A process according to claim 38, wherein said oxide constituent substantially comprises aluminum oxide.

40. A process according to claim 39, wherein said oxide constituent includes magnesium at a magnesium to aluminum ratio of not more than 1:3.

41. A process according to claim 1, wherein the heating step is conducted at the sintering temperature and for a period of time at said temperature such that said oxide constituent is caused to become substantially depleted in magnesium, and the sintered body is substantially free of magnesium.

42. A process according to claim 41, wherein said sintering temperature and said period of time is such that said oxide constituent is caused to become substantially depleted in aluminum, and the sintered body is substantially free of any secondary constituent.

43. A sintered ceramic product comprising a body of silicon carbide produced by the process of claim 1.

44. A sintered ceramic product comprising a body produced by pressureless liquid phase sintering and having at least 65 wt % silicon carbide, from about 5 wt % to not more than about 30 wt % secondary oxide constituent, and not more than about 2 wt % each of elemental silicon and glassy phase; the SiC of said body substantially comprising equi-axed, rounded SiC grains; said body being essentially free of oxycarbide and, apart from incidental impurities, free of any rare earth element, and having a fixed bulk density in excess of 2.95 g.cc$^{-1}$.

45. A product according to claim 44, wherein any oxide constituent substantially comprises aluminum oxide.

46. A product according to claim 44, wherein any oxide constituent comprises aluminum oxide containing magnesium at a magnesium to aluminum ratio of not more than 1:3.

47. A product according to claim 44, wherein said body comprises at least 80 wt % silicon carbide.

48. A product according to claim 47, wherein said body comprises at least 85 wt % silicon carbide.

49. A product according to claim 47, wherein said body comprises at least 98 wt % silicon carbide.

50. A product according to claim 47, wherein said body comprises at least 95 wt % silicon carbide, the body exhibiting a microstructure in which any constituents other than silicon carbide are substantially present in solid solution.

51. A product according to claim 44, wherein said body has a fired bulk density in excess of 3.00 g.cc$^{-1}$.

52. A product according to claim 44, wherein said body has a fired bulk density in excess of 3.15 g.cc$^{-1}$.

53. A product according to claim 44, wherein said body has a hardness in excess of 18.5 GPa.

54. A product according to claim 44, wherein said product has a fracture toughness in excess of 4 MPa.m$^{0.5}$ (based on the Antsis et al equation).

55. A product according to claim 54, wherein said fracture toughness is in excess of 4.5 MPa.m$^{0.5}$.

56. A product according to claim 44 wherein said body has a hardness in excess of 26 GPa.

57. A product according to claim 44 wherein said body has a fracture toughness in excess of 5.0 MPa.m$^{0.5}$.

58. A product according to claim 51, wherein said fired bulk density is in excess of 3.1 g.cc$^{-1}$.

59. A product according to claim 52, wherein said fired bulk density is in excess of 3.25 g.cc$^{-1}$.

* * * * *